US010278522B2

(12) United States Patent
Minami et al.

(10) Patent No.: US 10,278,522 B2
(45) Date of Patent: May 7, 2019

(54) TIRE ARRANGEMENT IMPLEMENT AND TIRE ARRANGEMENT METHOD

(71) Applicant: The Yokohama Rubber Co., LTD., Minato-ku, Tokyo (JP)

(72) Inventors: Yuji Minami, Hiratsuka (JP); Masatoshi Kuwajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 62 days.

(21) Appl. No.: 15/104,888

(22) PCT Filed: Dec. 16, 2014

(86) PCT No.: PCT/JP2014/083287
§ 371 (c)(1),
(2) Date: Jun. 15, 2016

(87) PCT Pub. No.: WO2015/093487
PCT Pub. Date: Jun. 25, 2015

(65) Prior Publication Data
US 2016/0316937 A1    Nov. 3, 2016

(30) Foreign Application Priority Data

Dec. 16, 2013  (JP) ................................. 2013-259546

(51) Int. Cl.
*B65D 85/02* (2006.01)
*A47F 7/04* (2006.01)
(Continued)

(52) U.S. Cl.
CPC ................ *A47F 7/04* (2013.01); *B60B 30/08* (2013.01); *B65D 57/00* (2013.01); *B65D 85/06* (2013.01); *B60C 19/00* (2013.01)

(58) Field of Classification Search
CPC ........... A47F 7/04; B60B 30/00; B60B 30/04; B60B 30/08; B60B 7/00; B60B 7/04;
(Continued)

(56) References Cited

U.S. PATENT DOCUMENTS 1,658,696 A * 2/1928 Walrath ............... B62D 43/005
206/304
3,012,663 A 12/1961 Thorne
(Continued)

FOREIGN PATENT DOCUMENTS

DE  10 2004 057 168   9/2005
JP  S48-051872        7/1973
(Continued)

OTHER PUBLICATIONS

International Search Report for International Application No. PCT/JP2014/083287 dated Mar. 24, 2015, 4 pages, Japan.

*Primary Examiner* — Rafael A Ortiz
(74) *Attorney, Agent, or Firm* — Thorpe North & Western

(57) ABSTRACT

The tire arrangement implement is employed to arrange a plurality of tires, each provided with a decorative portion located on a sidewall portion, in a row in the tire rotational axis direction. The tire arrangement implement comprises a spacer. The spacer is disposed between adjacent tires or between the tire and the floor, not in contact with the decorative portion, and separates the decorative portion of one tire from another tire or the peripherally located member.

14 Claims, 26 Drawing Sheets

(51) Int. Cl.
  *B60B 30/08*   (2006.01)
  *B65D 85/06*   (2006.01)
  *B65D 57/00*   (2006.01)
  *B60C 19/00*   (2006.01)

(58) Field of Classification Search
  CPC ......... B60B 31/06; B60B 30/06; B65D 85/06; B65D 85/02; B65D 57/00
  USPC ............ 206/503, 303, 499, 304.2, 304, 516, 206/304.1; 53/409, 447, 540, 541
  See application file for complete search history.

(56)  References Cited

U.S. PATENT DOCUMENTS 4,069,359 A * 1/1978 DeMarse ............ B29C 37/0075
  138/112
4,343,342 A     8/1982 McDonald

FOREIGN PATENT DOCUMENTS

| JP | S57-0167805 | 10/1982 |
| JP | S58-070906 | 5/1983 |
| JP | S62-055124 | 3/1987 |
| JP | H06-030082 | 4/1994 |
| JP | H08-040547 | 2/1996 |
| JP | H08-0324662 | 12/1996 |
| JP | 2004-268665 | 9/2004 |
| JP | 2005-171694 | 6/2005 |
| JP | 2010-064398 | 3/2010 |
| JP | 4899995 | 3/2012 |

* cited by examiner

VIEW ALONG A-A

VIEW ALONG B-B

VIEW ALONG C-C

FIG. 10A
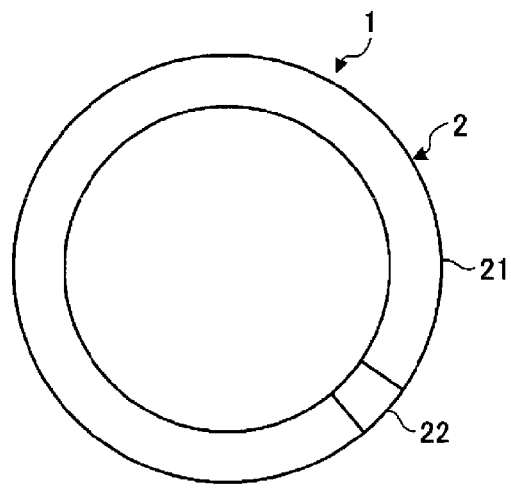
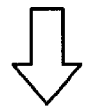
FIG. 10B
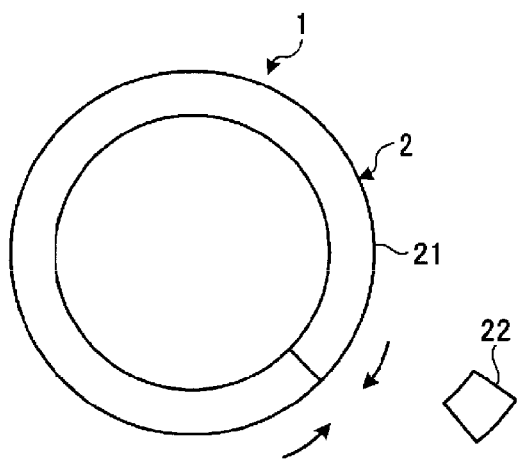

FIG. 11A
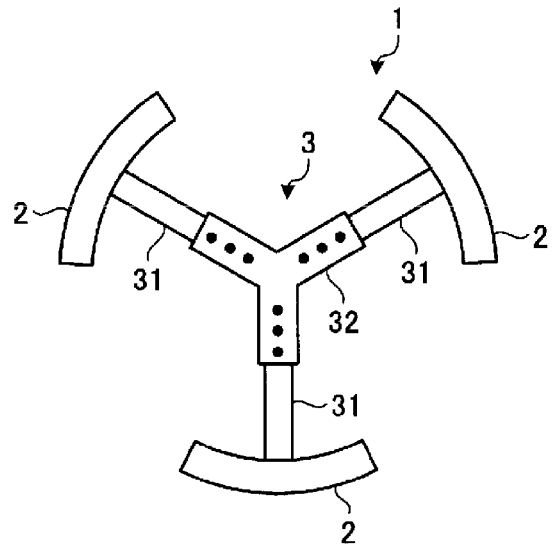
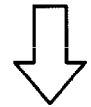
FIG. 11B
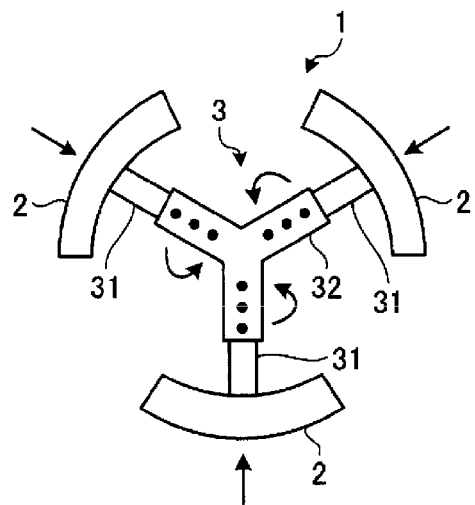

| | CONVENTIONAL EXAMPLE 1 | CONVENTIONAL EXAMPLE 2 | WORKING EXAMPLE 1 | WORKING EXAMPLE 2 | WORKING EXAMPLE 3 | WORKING EXAMPLE 4 |
|---|---|---|---|---|---|---|
| DECORATIVE PORTION ON SIDEWALL PORTION | COLORED PORTION | FIN | COLORED PORTION | COLORED PORTION | FIN | FIN |
| SHAPE OF TIRE ARRANGEMENT IMPLEMENT | — | — | ANNULAR | ANNULAR | ANNULAR | ANNULAR |
| POSITION OF IMPLEMENT | — | — | BEAD PORTION | SHOULDER PORTION | BEAD PORTION | SHOULDER PORTION |
| TOTAL NUMBER OF LOCATIONS OF BLEMISHES | 12 | 72 | 0 | 0 | 0 | 0 |

FIG. 36

CONVENTIONAL EXAMPLE

US 10,278,522 B2

TIRE ARRANGEMENT IMPLEMENT AND TIRE ARRANGEMENT METHOD

TECHNICAL FIELD

The present technology relates to a tire arrangement implement and a tire arrangement method, and particularly relates to a tire arrangement implement and a tire arrangement method capable of preventing blemishes that detract from the appearance of a tire.

BACKGROUND ART

Conventionally, upon storage, transport, or display of tires, a method of arranging a plurality of tires or a plurality of tire-wheel assemblies in a row in the tire rotational axis direction has been widely employed. Examples of methods that have been employed include a method of arranging a plurality of tires on the floor stacked in a row with the tire rotational axes thereof vertically facing.

The technologies described in Japanese Unexamined Patent Application Publication No. 2004-268665A and Japanese Patent No. 4899995B are such known conventional tire arrangement methods.

However, upon storage, transport, or display of tires, the side surfaces of adjacent tires come into contact with one another and the side surface of a tire comes into contact with the floor and the like. When this happens, the decorative portions located on the sidewall portions experience rubbing or deformation and blemishes that detract from the appearance of the decorative portions are formed.

SUMMARY

The present technology provides a tire arrangement implement and a tire arrangement method capable of preventing blemishes that detract from the appearance of the tire.

The present technology provides a tire arrangement implement for arranging tires provided with a decorative portion located on a sidewall portion in a row in a tire rotational axis direction. The tire arrangement implement includes a spacer configured to be disposed between adjacent tires of the tires or between one of the tires and a peripherally located member, not in contact with the decorative portion. The spacer separates the decorative portion of one of the tires from another one of the tires or the peripherally located member.

In addition, the present technology provides a tire arrangement implement for arranging a plurality of tire-wheel assemblies constituted by a tire provided with a decorative portion located on a sidewall portion and a wheel in a row in a tire rotational axis direction. The tire arrangement implement includes a spacer configured to be disposed between adjacent tire-wheel assemblies of the plurality of tire-wheel assemblies or between one of the tire-wheel assemblies and a peripherally located member, not in contact with the decorative portion. The spacer separates the decorative portion of one of the tire-wheel assemblies from another one of the tire-wheel assemblies or the peripherally located member.

The present technology also provides a tire arrangement method including the step of using the tire arrangement implement described in any one of aforementioned.

With the tire arrangement implement and the tire arrangement method of the present technology, the spacer separates the decorative portion of one tire from another tire or the peripherally located member when a plurality of tires are arranged in a row. Accordingly, rubbing and deformation of the decorative portion is reduced or prevented, and blemishes that detract from the appearance of the tire are prevented, which is advantageous.

BRIEF DESCRIPTION OF DRAWINGS

FIGS. 10A, 10B are explanatory views illustrating a modified example of the tire arrangement implement illustrated in FIG. 4.

FIGS. 11A, 11B are explanatory views illustrating a modified example of the tire arrangement implement illustrated in FIG. 4.

FIG. 36 is a table showing results of performance testing of pneumatic tires according to the embodiment of the technology.

DETAILED DESCRIPTION

The technology is described in detail below with reference to the accompanying drawings. However, the technology is not limited to the embodiment. In addition, the components of the embodiment include components that are replaceable while maintaining consistency with the technology, and obviously replaceable components. Furthermore, the plurality of modified examples described in the embodiment may be freely combined within the scope of obviousness to a person skilled in the art.

Tire Arrangement Implement and Tire Arrangement Method

Conventionally, upon storage, transport, or display of tires, a method of arranging a plurality of tires or a plurality of tire-wheel assemblies in a row in the tire rotational axis direction has been widely employed. Examples of methods that have been employed include a method of arranging a plurality of tires on the floor stacked in a row with the tire rotational axes thereof vertically facing, and a method of storing a plurality of tires in a horizontal rack, the tires being arranged in a row with the tire rotational axes thereof horizontally facing.

However, conventional tire arrangement methods allow the side surfaces of adjacent tires to come into contact with one another, and side surfaces of tires to come into contact with peripherally located members (such as the floor, walls, apparatuses). When this happens, the decorative portions located on the sidewall portions experience rubbing or deformation. This in turn results in undesirable blemishes that detract from the appearance of the tire.

In addition, tires provided with protrusions such as fins on the sidewall portions are unstable when stacked and such stacks can easily collapse.

In order to resolve or minimize the shortcomings described above, the tire arrangement method may have the following configuration (see FIGS. 1 to 5).

Figure 1:
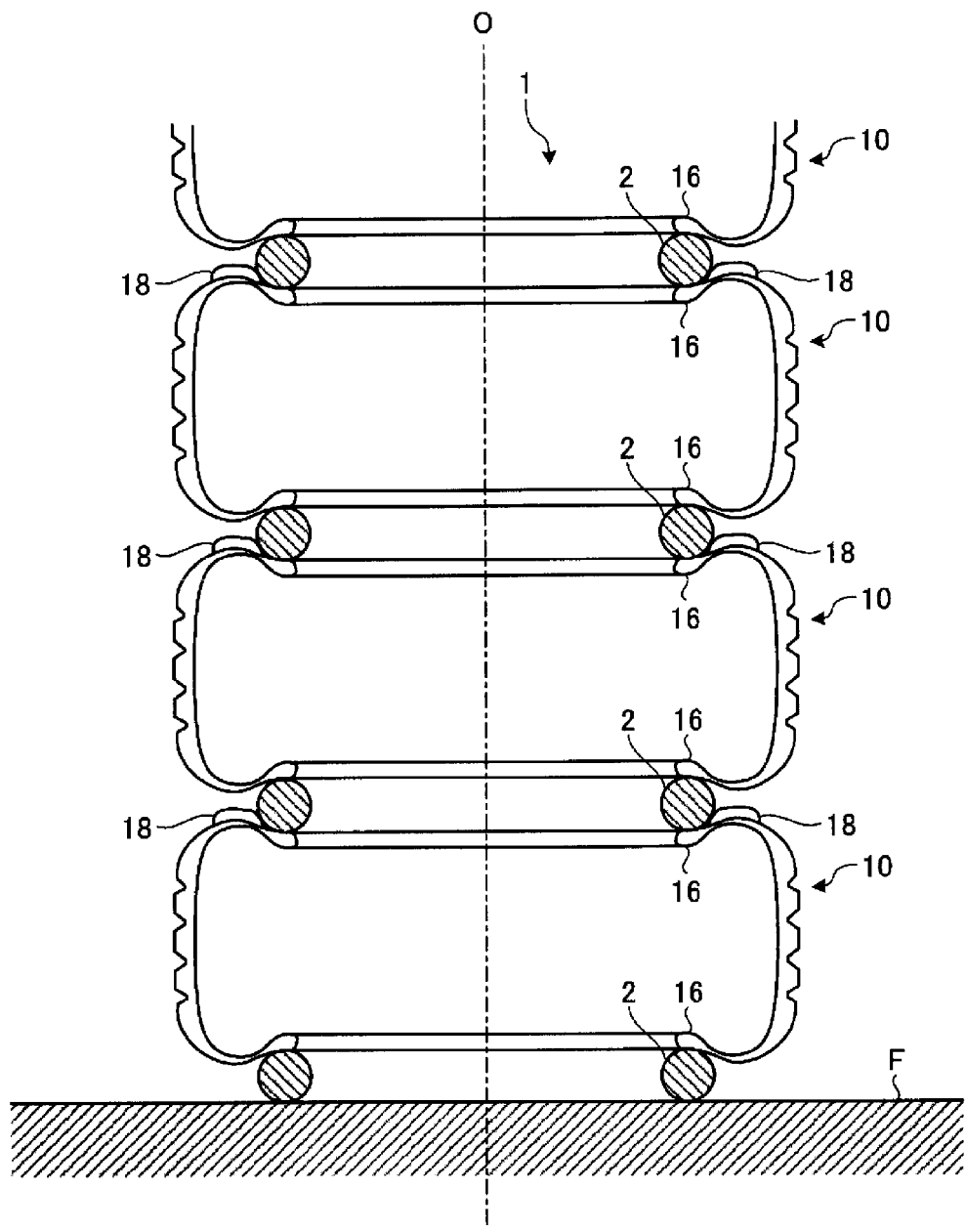
FIG. 1 is an explanatory view illustrating a tire arrangement method according to an embodiment of the technology.
Figure 2:
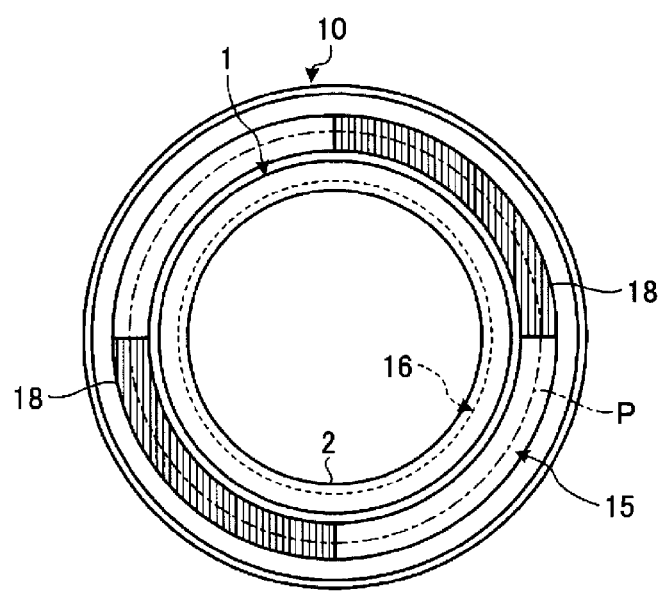
FIG. 2 is an explanatory view illustrating the tire arrangement method according to the embodiment of the technology.
Figure 3:
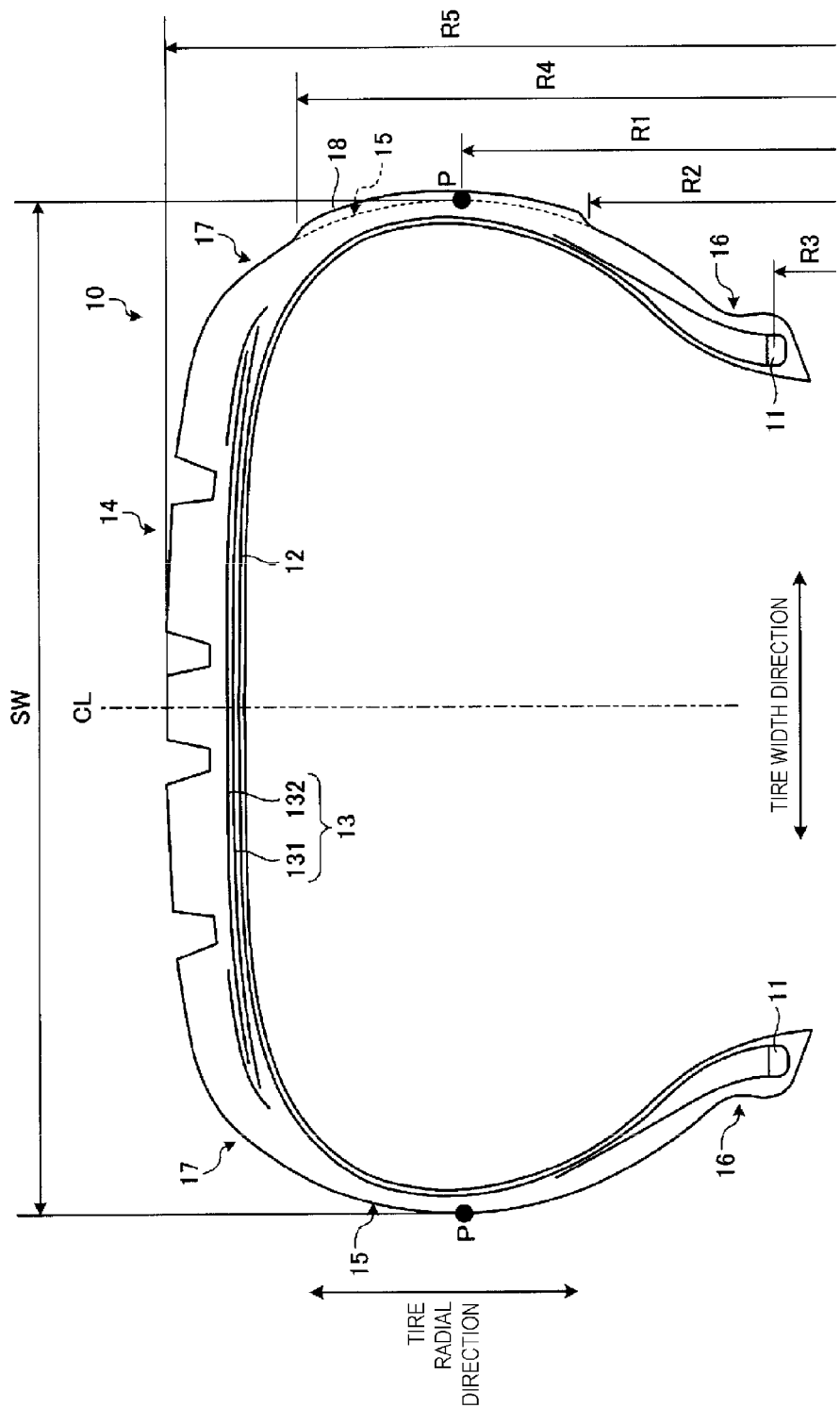
FIG. 3 is a cross-sectional view in a tire meridian direction illustrating a tire.
Figure 4:
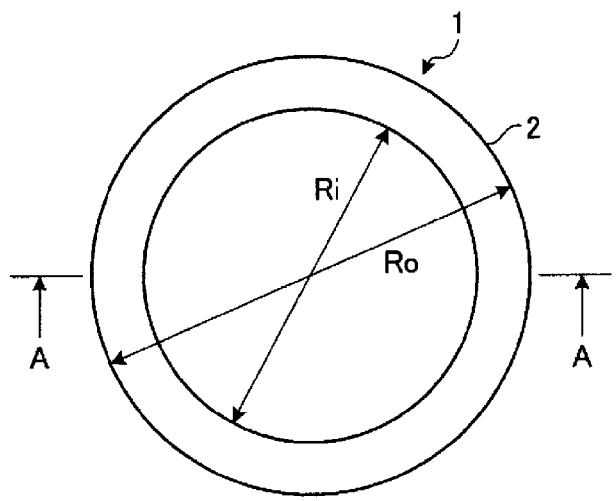
FIG. 4 is a plan view illustrating a tire arrangement implement.
Figure 5:
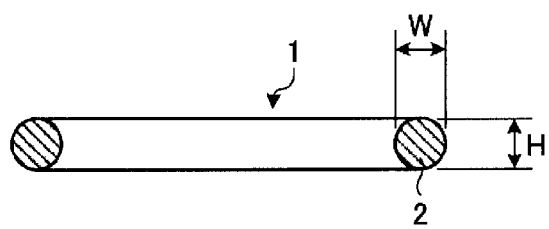
FIG. 5 is a cross-sectional view taken along A-A illustrating the tire arrangement implement.

FIG. 1 and FIG. 2 are explanatory views illustrating the tire arrangement method according to the embodiment of the technology. FIG. 3 is a cross-sectional view in a tire meridian direction of a tire. FIG. 4 is a plan view illustrating a tire arrangement implement. FIG. 5 is a cross-sectional view of the tire arrangement implement taken along A-A of FIG. 4. FIG. 1 is a cross-sectional view along the tire rotational axis when a plurality of tires 10 are vertically stacked on the floor F. FIG. 2 illustrates the positional relationship between the tire 10 illustrated in FIG. 1 and the tire arrangement implement 1 in the tire radial direction. FIG. 3 illustrates the region to one side in the radial direction of an individual tire 10. FIGS. 4 and 5 illustrate an individual tire arrangement implement 1. Note that the reference sign O in FIG. 1 denotes the tire rotational axis, and the reference sign CL in FIG. 3 denotes the tire equatorial plane.

As illustrated in FIG. 3, a typical pneumatic tire 10 is provided with a left/right pair of bead cores 11, 11; a carcass layer 12 mounted across the bead cores 11, 11; a belt layer 13 disposed to the outer side of the carcass layer 12 in the tire radial direction, the belt layer 13 being formed by a plurality of layered belt plies 131, 132; and rubber members such as a tread rubber, sidewall rubber, and rim cushion rubber (reference sign omitted). In addition, the tire 10 is provided with a tread portion 14 that composes the tread surface, sidewall portions 15 that compose the tire side surface, bead portions 16 that compose the rim fitting surface, and shoulder portions 17 that connect the tread portion 14 and the sidewall portions 15.

The tire 10 is also provided with a decorative portion 18. "Decorative portion 18" refers to a decoration applied to the wall surface of the sidewall portion 15. The decorative portion 18 is for example a colored portion, a printed portion, a grooved and ridged portion, or an adhered article and is formed at a predetermined region on the sidewall portion 15. The decorative portion 18 composes, for example, brand or alphanumeric markings, tire side surface designs, or fins constituted by protrusions or ridges.

In the configuration illustrated in FIG. 3 for example, the decorative portion 18 is a fin formed on one of the sidewall portions 15. The fin is formed protruding from the profile of the sidewall portion 15 (the dashed line in FIG. 3) and is capable of reducing air resistance when traveling and improving fuel economy by generating a turbulent flow to streamline the air flow when the tire is rotating.

As illustrated in FIG. 1, in the tire arrangement method, the tire arrangement implement 1 is used to arrange the plurality of tires 10 in a row in the tire rotational axis direction.

The tire arrangement implement 1 is provided with a plurality of spacers 2. The spacers 2, as illustrated in FIG. 1, are arranged between adjacent tires 10, 10 or between one of the tires 10 and a peripherally located member (the floor F in FIG. 1). As illustrated in FIG. 2, the spacer 2 is arranged not in contact with the decorative portion 18 located on the sidewall portion 15. In addition, the spacer 2 functions as an interposing member that separates the decorative portion 18 of the tire 10 from another tire 10 or a peripherally located member.

Examples of peripherally located members include the floor where tires are arranged, pallets for transporting tires, display stands for tires, and the loading space of a transport vehicle for a plurality of vertically stacked tires.

In the configuration illustrated in FIGS. 1 and 2, the spacer 2 is made of metal or resin, and as illustrated in FIGS. 4 and 5 has an annular shape with a uniform cross section in the circumferential direction. In addition, the spacer 2 has a predetermined outer diameter Ro, inner diameter Ri, cross-sectional height H, and width W. The cross-sectional height H is the height of the spacer 2 in the axial direction, and the width W is the width of the spacer 2 in the radial direction.

As described above, the spacer 2 is preferably made of metal or resin. A spacer 2 made from such material is excellent in terms of ease of manufacture and durability. However, the material is not limited thereto and the spacer 2 may be made of elastomer, paper, or the like. Specifically, with the proviso that the tire weight can be withstood, the spacer 2 may have a structure formed from an inflated tube member made of elastomer or a cylindrical member made from paper (paper cylinder) formed into an annular shape (not illustrated). In addition, the spacer 2 may have a hollow or solid structure. The spacer 2 may also be fiber reinforced.

In the configuration illustrated in FIG. 2, the outer diameter Ro of the spacer 2 (see FIG. 4) and the tire diameter R1 at the tire maximum width position P (see FIG. 3) have the relationship Ro<R1. Accordingly, the spacer 2 is disposed to the inner side of the tire maximum width position P in the tire radial direction.

"Tire maximum width position P" refers to the maximum width position of the tire cross-sectional width. The tire cross-sectional width is measured by measuring an individual tire in an unloaded state. The tire cross-sectional width is also measured with reference to the profile of the sidewall portions 15 disregarding the decorative portion 18.

In addition, in the configuration illustrated in FIG. 2, the outer diameter Ro of the spacer 2 (see FIG. 4) and the inner diameter R2 of the decorative portion 18 located on the sidewall portion 15 (see FIG. 3) have the relationship Ro<R2. Accordingly, the spacer 2 is disposed offset to the inner side of the decorative portion 18 in the tire radial direction so that the spacer 2 and the decorative portion 18 do not interfere with each other.

The inner diameter R2 of the decorative portion 18 is measured with reference to the point furthest to the inner side of the region where the decorative portion 18 is disposed in the tire radial direction (see FIG. 3).

In addition, in the configuration illustrated in FIG. 2, the outer diameter Ro of the spacer 2 (see FIG. 4) and the diameter R3 of the bead core 11 (see FIG. 3) have the relationship R3<Ro. As a result, the outer diameter Ro of the spacer 2 is larger than the diameter R3 of the bead core 11. Accordingly, the spacer 2 can engage with the bead portion 16 in a stable manner without falling inside the tire when the tires are arranged.

The diameter R3 of the bead core 11 is measured with reference to the portion of the bead core 11 furthest to the inner side in the tire radial direction when viewed in cross section along the tire meridian direction.

In addition, in the configuration illustrated in FIG. 2, the outer diameter Ro of the spacer 2, the inner diameter Ri of the spacer 2 (see FIG. 4), and the diameter R3 of the bead core 11 (see FIG. 3) have the relationship Ri<R3<Ro. Accordingly, the spacer 2 and the bead core 11 overlap in the direction of the tire rotational axis O and engage in a stable manner with each other when the tires are arranged.

Note that the embodiment is not limited to that described above. In particular, the inner diameter Ri of the spacer 2 is not limited and may have the relationship with the diameter R3 of the bead core 11 such that R3≤Ri (not illustrated). With such a configuration, the spacer 2 can still engage in a stable manner with the bead portion 16 when the tires are arranged.

In the configuration illustrated in FIG. 1, the plurality of tires 10 are arranged stacked in a row on the floor F with the tire rotational axes O thereof vertically facing. One spacer 2 is arranged between adjacent tires 10, 10 and between the tire 10 and the floor F. In addition, the plurality of tires 10 and spacers 2 are alternately arranged.

Specifically, a first spacer 2 is initially disposed on the floor F. Thereafter, a first tire 10 is placed on the upper portion of the first spacer 2 with the axes thereof aligned. As a result, the bead portion 16 of the tire 10 and the spacer 2 engage and the tire 10 is supported by the spacer 2. Accordingly, the tire 10 is supported separated from the floor F. Next, a second spacer 2 is arranged on the upper portion of the first tire 10 with the axes thereof aligned (see FIG. 2). Thereafter, a second tire 10 is placed on the upper portion of the second spacer 2. As a result, the bead portion 16 of the second tire 10 and the second spacer 2 engage and the tire 10 is supported by the spacer 2. Accordingly, the first tire 10 and the second tire 10 are supported separated from each other. Thereafter, the plurality of spacers 2 and tires 10 are alternately arranged stacked in a row in the tire rotational axis direction. Accordingly, the plurality of tires 10 are arranged with the decorative portion 18 located on the sidewall portion 15 not in contact with the adjacent tire 10 or the floor F.

Note that in the configuration illustrated in FIG. 1, as described above, the spacers 2 and the tires 10 are arranged alternately stacked in a row in the tire rotational axis direction.

However, the embodiment is not limited to such a configuration, and included are cases in which the plurality of tires 10 are in part stacked without being interposed by spacers 2. That is, in the case of no decorative portions 18 being present between mutually facing sidewall portions 15, 15 of tires 10, 10 (not illustrated), such problematic blemishes to the appearance of the decorative portions are not caused, and disposing spacers 2 at that position can be omitted. In addition, in the case of no decorative portions 18 being present between the bottom-most tire 10 and the floor F (see FIG. 1), disposing spacers 2 at that position can be omitted.

As illustrated in FIG. 3 for example, when the tire 10 is provided with the decorative portion 18 only located on the sidewall portion 15 to one side, the first tire 10 may be arranged in direct contact with the floor F without a spacer 2 therebetween with the sidewall portion 15 without the decorative portion 18 facing the floor F (not illustrated). Thereafter, the second tire 10 is stacked on top of the first tire 10 with the sidewall portion 15 having the decorative portion 18 facing the floor F. At this time, because the decorative portion 18 is present between the first tire 10 and the second tire 10, the spacer 2 is disposed between the two opposing sidewall portions 15, 15 in a similar manner to that illustrated in FIG. 1. In addition, the cross-sectional height H of the spacer 2 (see FIG. 5) is suitably set so that the opposing decorative portions 18, 18 do not come into contact with each other. Next, the third tire 10 is stacked on top of the second tire 10 with the sidewall portion 15 without the decorative portion 18 facing the floor F. As a result, no decorative portion 18 is present between the second tire 10 and the third tire 10, thus disposing a spacer 2 at that position can be omitted.

The lower limit value of the cross-sectional height H of the spacer 2 (see FIG. 5) is suitably set so that the sidewall portion 15 (particularly decorative portion 18) of the tire 10 and the adjacent tire 10 or floor F do not come into contact with each other when the tires are arranged as illustrated in FIG. 1. Specifically, the cross-sectional height H of the spacer 2 is suitably set in accordance with the cross-sectional height of the fin (which is a decorative portion 18), the tire size, and the like. In such a case, in the arrangement method of stacking the plurality of tires 10 as illustrated in FIG. 1, the cross-sectional height H of the spacer 2 is set taking into consideration bending of the bead portion 16 of a tire 10 due to the weight of upper tires 10 and the dead weight of the tire 10. When the cross-sectional height H of the spacer 2 is insufficient, the sidewall portion 15 of the tire 10 may come into contact with the adjacent tire 10 or the floor F especially when the bead portion 16 of a lower tire 10 deforms, which is not preferable.

Moving to the upper limit value of the cross-sectional height H of the spacer 2 (see FIG. 5), the upper limit value preferably has the relationship with the tire cross-sectional width SW such that H/SW≤1.00, and more preferably such that H/SW≤0.5. When the cross-sectional height H of the spacer 2 is too large, as illustrated in FIG. 1, stacking the plurality of tires 10 results in the arrangement of tires 10 becoming unstable, which is not preferable.

The tire cross-sectional width SW is measured by determining the linear distance between the sidewall portions 15, 15 of an individual tire disregarding any decorative portion 18 on the tire side surface such as patterns or alphanumerics when the tire is in an unloaded state.

The width W of the spacer 2 (see FIG. 5) is not particularly limited and may be suitably set with reference to the outer diameter Ro and inner diameter Ri of the spacer 2 (see FIG. 4) in a range in which the rigidity of the spacer 2 can be ensured.

Note that in the configuration illustrated in FIG. 1, the plurality of tires 10 are arranged stacked on the floor F.

However the embodiment is not limited to such a configuration, and a tire arrangement method may be employed in which the plurality of tires 10 are stored in a horizontal rack. In such a case, a configuration similar to that of the configuration illustrated in FIG. 1 can be employed (not illustrated). Specifically, the plurality of tires 10 are arranged in a row with the tire rotational axes O thereof horizontally facing and aligned. In addition, one spacer 2 is disposed between adjacent tires 10, 10.

In this case, the spacer 2 (tire arrangement implement 1) preferably has a structure which is detachable from the tire 10. Example structures of the spacer 2 (not illustrated) include: (a) the spacer 2 provided with a coupling portion that has an outer diameter that corresponds to the inner diameter of the bead portion 16, the coupling portion snugly fitting with the inner circumferential surface of the bead portion 16 thus supporting the bead portion 16; and (b) the spacer 2 provided with an anchoring portion such as a hook, the anchoring portion anchoring to the bead toe of the bead portion 16 thus supporting the bead portion 16. Accordingly, the spacer 2 is suitably arranged so as to not fall out from between the tires 10.

Modified Examples

Figure 6:
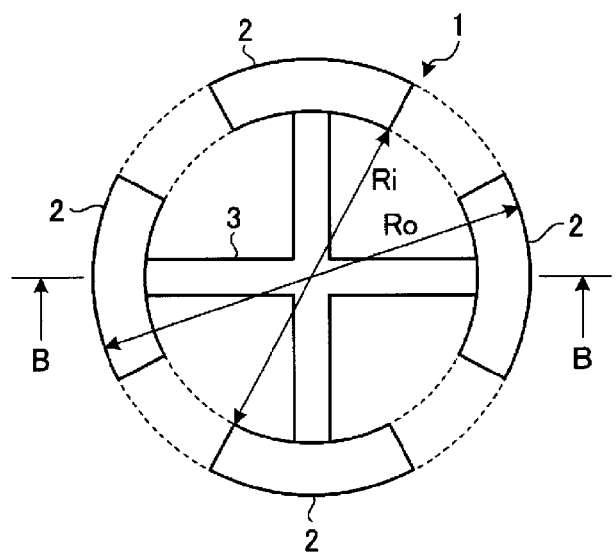
FIG. 6 is an explanatory view illustrating a modified example of the tire arrangement implement illustrated in FIG. 4.
Figure 7:
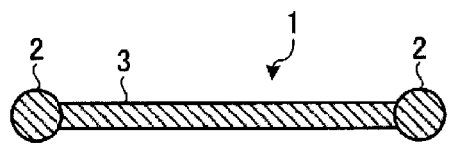
FIG. 7 is an explanatory view illustrating the modified example of the tire arrangement implement illustrated in FIG. 4.
Figure 8:
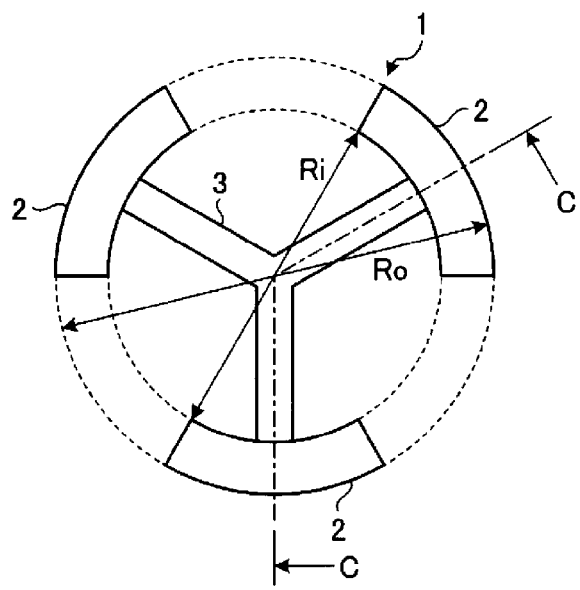
FIG. 8 is an explanatory view illustrating a modified example of the tire arrangement implement illustrated in FIG. 4.
Figure 9:
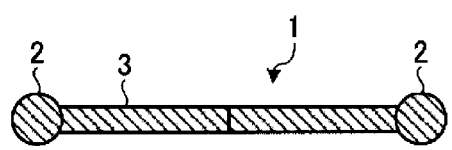
FIG. 9 is an explanatory view illustrating the modified example of the tire arrangement implement illustrated in FIG. 4.

FIGS. 6 to 9 are explanatory views of modified examples of the tire arrangement implement illustrated in FIG. 4. FIG. 6 is a plan view of the first modified example of the tire arrangement implement 1. FIG. 7 is a cross-sectional view of the tire arrangement implement 1 of FIG. 6 taken along B-B. FIG. 8 is a plan view of the second modified example of the tire arrangement implement 1. FIG. 9 is a cross-sectional view of the tire arrangement implement 1 of FIG. 8 taken along C-C. Note that the dashed lines in FIGS. 6 and 8 represent an imaginary circles formed by connecting the inner circumferential surface and outer peripheral surface of the spacers 2.

In the configuration illustrated in FIG. 4, as described above, the spacer 2 has an annular structure continuous in the circumferential direction. With such a configuration, contact surface of the spacer 2 and the tire 10 is ensured to a considerable degree. Thus, the spacer 2 and the tire 10 (the bead portion 16 in FIG. 1) suitably engage with each other. In addition, rigidity of the spacer 2 in the circumferential direction and the axial direction is ensured. Thus, deformation of the spacer 2 is reduced or prevented. Such a configuration is preferable from the perspective of providing a stable arrangement of the tires 10 when the plurality of tires 10 are stacked as illustrated in FIG. 1.

However, the embodiment is not limited to such a configuration, and as illustrated in FIGS. 6 to 9, the spacer 2 may have a structure non-continuous in the tire circumferential direction.

For example, in the configurations illustrated in FIGS. 6 to 9, each of the spacers 2 has an arcuate shape with a uniform cross section, and the spacers 2 are arranged at predetermined intervals in the circumferential direction in an annular manner. In addition, the tire arrangement implement 1 is provided with an arm 3 for supporting these spacers 2. The arm 3 has a shape in which arms corresponding to the number of spacers 2 extend in a radial manner (in FIG. 6, a cross shape; in FIG. 8, a Y-shape). The arm 3 connects with the inner diameter portion of the spacer 2 at the leading end portions of the arm 3 and supports the spacer 2.

In addition, in the configurations illustrated in FIGS. 6 to 9, the tire arrangement implement 1 is provided with three or more spacers 2. In such configurations, the tire arrangement implement 1 engages with the tire 10 at three or more positions. Thus, these configurations are preferable from the perspective of stably supporting the tires 10 when the tires are arranged. However, the embodiment is not limited to such configurations, and the tire arrangement implement 1 may be provided with a pair of spacer 2, and an arm 3 that supports the pair of spacers 2 (not illustrated).

In addition, in the configurations illustrated in FIGS. 6 to 9, as illustrated in FIGS. 6 and 8, the outer diameter Ro and inner diameter Ri of the spacers 2 are measured with reference to the imaginary circle formed by connecting the inner circumferential surface and outer circumferential surface of the annularly arranged spacers 2.

Note that in the configurations illustrated in FIGS. 6 to 9, the spacers 2 include a hollow portion. These configurations are preferable from the perspective of reducing the weight of the tire arrangement implement 1. However, the embodiment is not limited to these configurations, and in the configuration in which the spacer 2 engages with the bead portion 16 (see FIGS. 1 and 2), the spacer 2 may have a plate-like shape such as a circular plate or an elliptical plate (not illustrated). In such a configuration, the spacer 2 still functions suitably as an interposing member that separates adjacent tires 10, 10.

FIGS. 10A, 10B and 11A, 11B are explanatory views illustrating modified examples of the tire arrangement implement illustrated in FIG. 4. FIGS. 10A and 11A illustrate the spacer 2 with its diameter expanded. FIGS. 10B and 11B illustrate the spacer 2 with its diameter reduced. In these configurations, components that are the same as components of the tire arrangement implement illustrated in FIGS. 4 and 8 are given the same reference numerals, and explanations thereof are omitted.

In the configuration illustrated in FIGS. 4 and 5, the spacer 2 has a constant circumferential length. The outer diameter Ro and inner diameter Ri of the spacer 2 is also fixed. In addition, in the configurations illustrated in FIGS. 6 to 9, the arm 3 has a constant length. The outer diameter Ro and the inner diameter Ri of the spacer 2 is also fixed. In such configurations, the spacer 2 has a simple structure. Thus these configurations are preferable from the perspective of the spacer 2 being easily formed.

In contrast, in the configurations illustrated in FIGS. 10A, 10B and 11A, 11B, the tire arrangement implement 1 has a structure in which the diameters Ro, Ri of the spacer 2 are expandable and reducible. In such configurations, the tire arrangement implement 1 can be applied to tires 10 of various tire sizes by expanding and reducing the diameters of the spacer 2 to correspond to the tire size.

In the configuration illustrated in FIGS. 10A, 10B for example, the spacer 2 is constituted by a spacer main body 21 and a segment 22. The spacer main body 21 is formed of flexible material such as resin and has a C-shape with a gap portion. In addition, the spacer main body 21 can be connected by butting the end portions of the gap portion together. The segment 22 is a member that can supplement the gap portion of the spacer main body 21 and is detachably connectable into the gap portion of the spacer main body 21. The structure employed as the joint structure of the gap portion of the spacer main body 21 is discretionary and may be a joint structure such as a dovetail structure.

In the state illustrated in FIG. 10A, the segment 22 is fitted in the gap portion of the spacer main body 21, and the spacer 2 is formed in an annular shape with a large diameter. In the state illustrated in FIG. 10B, the segment 22 is removed from the spacer main body 21 and both end portions of the spacer main body 21 are connected. As a result, the spacer 2 is formed in an annular shape with a small diameter. Accordingly, the diameters Ro, Ri of the spacer 2 having an annular structure are expandable and reducible.

Furthermore, in the configuration illustrated in FIGS. 10A, 10B, by replacing the segment 22 using a plurality of segments 22 with varying circumferential lengths, the diameters Ro, Ri of the spacer 2 in the state illustrated in FIG. 10A can be varied (not illustrated). In addition, the spacer main body 21 may have a structure divisible in the circumferential direction (not illustrated). Changes to the design of such structures can be appropriately made within the scope of obviousness to a person skilled in the art.

In the configuration illustrated in FIGS. 11A, 11B, the arm 3 supporting three spacers 2 is constituted by three arm main bodies 31 and a support portion 32. The three arm main bodies 31 are each coupled to the inner diameter portion of the corresponding spacer 2 thus supporting the spacers 2. The support portion 32 is a member that supports the arm main bodies 31 in a radial manner and can adjust the length of the arm main bodies 31. Specifically, the support portion 32 is constituted by cylindrical members forming a Y-shape disposed at intervals of 60° in the circumferential direction and radially extending in the radial direction. In addition, the three arm main bodies 31 are inserted into the opening end portions of the cylindrical members forming a Y-shape of the support portion 32 and are supported therein. The support portion 32 is provided with lock buttons. The position of the arm main bodies 31 can be locked by anchoring the arm main bodies 31 with the lock buttons.

In the state illustrated in FIG. 11A, the three arm main bodies 31 are extended out from the support portion 32 to the maximum position in the radial direction and locked in place in the support portion 32 via the lock buttons. As a result, the three spacers 2 are arranged in an annular shape with a large diameter. In the state illustrated in FIG. 11B, the three arm main bodies 31 are housed in the support portion 32 and locked in place via the lock buttons. As a result, the three spacers 2 are arranged in an annular shape with a small diameter. In such a manner, by extending or receding the three spacers 2 in the radial direction and locking the three spacers 2 at a predetermined position, the diameters Ro, Ri of the spacer 2 can be expanded and reduced.

Note that design changes to the above-described structure in which the arm main bodies 31 are extended from or receded into the support portion 32 and the structure in which the arm main bodies 31 are locked in the support portion 32 can be appropriately made within the scope of obviousness to a person skilled in the art. In addition, the variable structure of the arm 3 in which the diameters Ro, Ri of the spacer 2 can be expanded and reduced is not limited to that illustrated in FIGS. 11A, 11B, and changes to the design thereof can be appropriately made within the scope of obviousness to a person skilled in the art.

FIGS. 12 to 18 are explanatory views of modified examples of the tire arrangement implement illustrated in FIG. 4. These drawings illustrate a radial direction cross-sectional view of the spacer 2.

Figure 12:
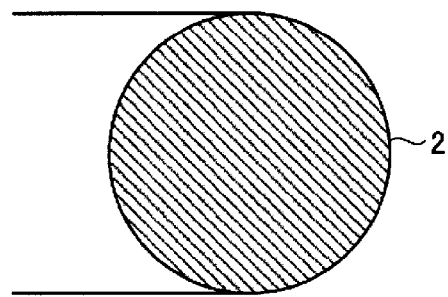
FIG. 12 is an explanatory view illustrating a modified example of the tire arrangement implement illustrated in FIG. 4.
Figure 13:
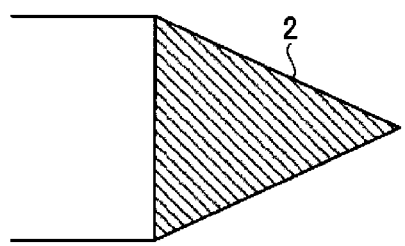
FIG. 13 is an explanatory view illustrating a modified example of the tire arrangement implement illustrated in FIG. 4.
Figure 14:
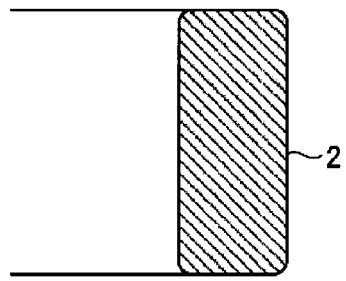
FIG. 14 is an explanatory view illustrating a modified example of the tire arrangement implement illustrated in FIG. 4.

In the configuration illustrated in FIG. 4, as illustrated in FIG. 12, the spacer 2 has a circular cross section. However, the shape of the cross section is not limited to the configuration, and the spacer 2 may have a triangular cross section (see FIG. 13) or a rectangular cross section (see FIG. 14). The shape of the spacer 2 can be appropriately selected within the scope of obviousness to a person skilled in the art.

Figure 15:
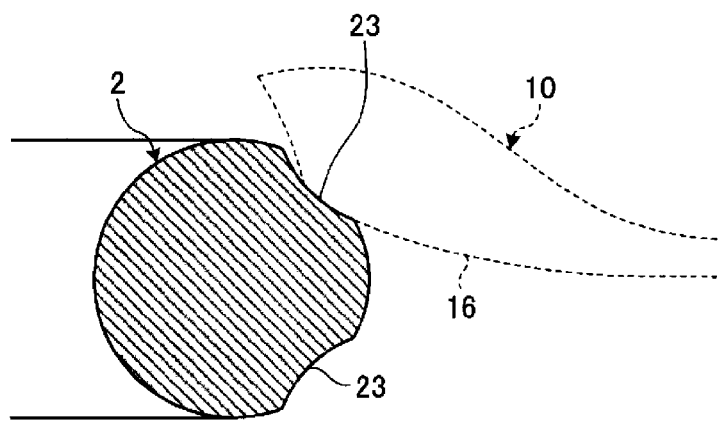
FIG. 15 is an explanatory view illustrating a modified example of the tire arrangement implement illustrated in FIG. 4.
Figure 16:
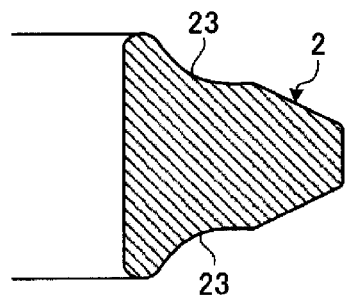
FIG. 16 is an explanatory view illustrating a modified example of the tire arrangement implement illustrated in FIG. 4.
Figure 17:
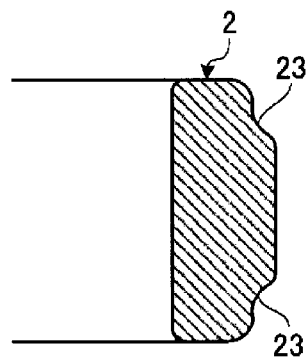
FIG. 17 is an explanatory view illustrating a modified example of the tire arrangement implement illustrated in FIG. 4.

In the configurations illustrated in FIGS. 15 to 17, the spacer 2 is provided with a recessed portion 23 that mates with the circumferential surface of the tire 10. In such configurations, the spacer 2 stably engages with the tire 10 via the mating of the recessed portion 23 of the spacer 2 and the circumferential surface of the tire 10 when the tires are arranged. Accordingly, relative change in position between the spacer 2 and the tire 10 is reduced or prevented.

For example, in the configuration illustrated in FIG. 15, the spacer 2 has a circular cross section including the arcuate recessed portion 23. In addition, the recessed portion 23 is disposed at a position and has a size that enables mating with the bead heel of the bead portion 16 of the tire 10. Specifically, the spacer 2 is provided with a pair of recessed portions 23, 23 at positions on the upper and lower side in the axial direction to the outer side in the radial direction of the spacer 2. In addition, the spacer 2 has a uniform cross section in the circumferential direction. As a result, the recessed portions 23, 23 are formed along the entire circumference of the spacer 2. The recessed portion 23 has a curvature substantially identical with that of the profile of the bead heel of the bead portion 16 when viewed in cross section along the tire meridian direction.

In such a configuration, the recessed portion 23 of the spacer 2 and the bead heel of the bead portion 16 fit snugly and are stably engaged with each other when tires 10 are arranged stacked as illustrated in FIGS. 1 and 2. Accordingly, relative change in position between the spacer 2 and the tire 10 is effectively reduced or prevented and stacks of the tires 10 are prevented from collapsing.

Note that the recessed portion 23 may have an arcuate shape as illustrated in FIGS. 15 to 17, or may have a rectangular or triangular shape (not illustrated).

Figure 18:
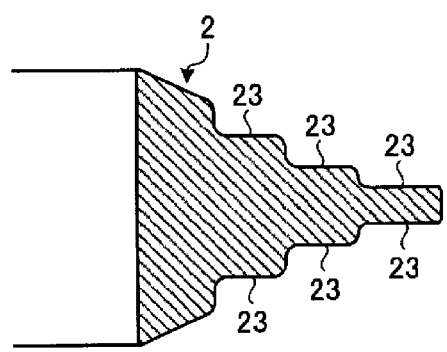
FIG. 18 is an explanatory view illustrating a modified example of the tire arrangement implement illustrated in FIG. 4.

In the configuration illustrated in FIG. 18, the spacer 2 is provided with a plurality of recessed portions 23 disposed offset from one another in a step-like manner. Specifically, the spacer 2 is provided with a set of recessed portions 23 on both the upper and lower sides in the axial direction to the outer side in the radial direction of the spacer 2. The recessed portions 23 of such a set are disposed in a step-like manner with the positions thereof varying in the radial and axial direction of the spacer 2. In addition, the spacer 2 has a uniform cross section in the circumferential direction. As a result, the recessed portions 23, 23 are formed along the entire circumference of the spacer 2. The recessed portions 23 have a size that enables mating with the bead heel of the bead portion 16.

In such a configuration, any of the recessed portions 23 of the spacer 2 and the bead heel of the bead portion 16 fit snugly and stably engage with each other when tires 10 are arranged stacked as illustrated in FIGS. 1 and 2. Accordingly, relative change in position between the spacer 2 and the tire 10 is effectively reduced or prevented and stacks of the tires 10 are prevented from collapsing. In addition, by the spacer 2 having a plurality of step-like recessed portions 23, the spacer 2 can be applied to various tires 10 having different tire sizes. Specifically, in the case of variance in the position of the bead heel of the bead portion 16 due to variance in the tire size, the spacer 2 and the bead portion 16 stably engage due to the spacer 2 having a recessed portion 23 at the position of each bead heel.

Figure 19:
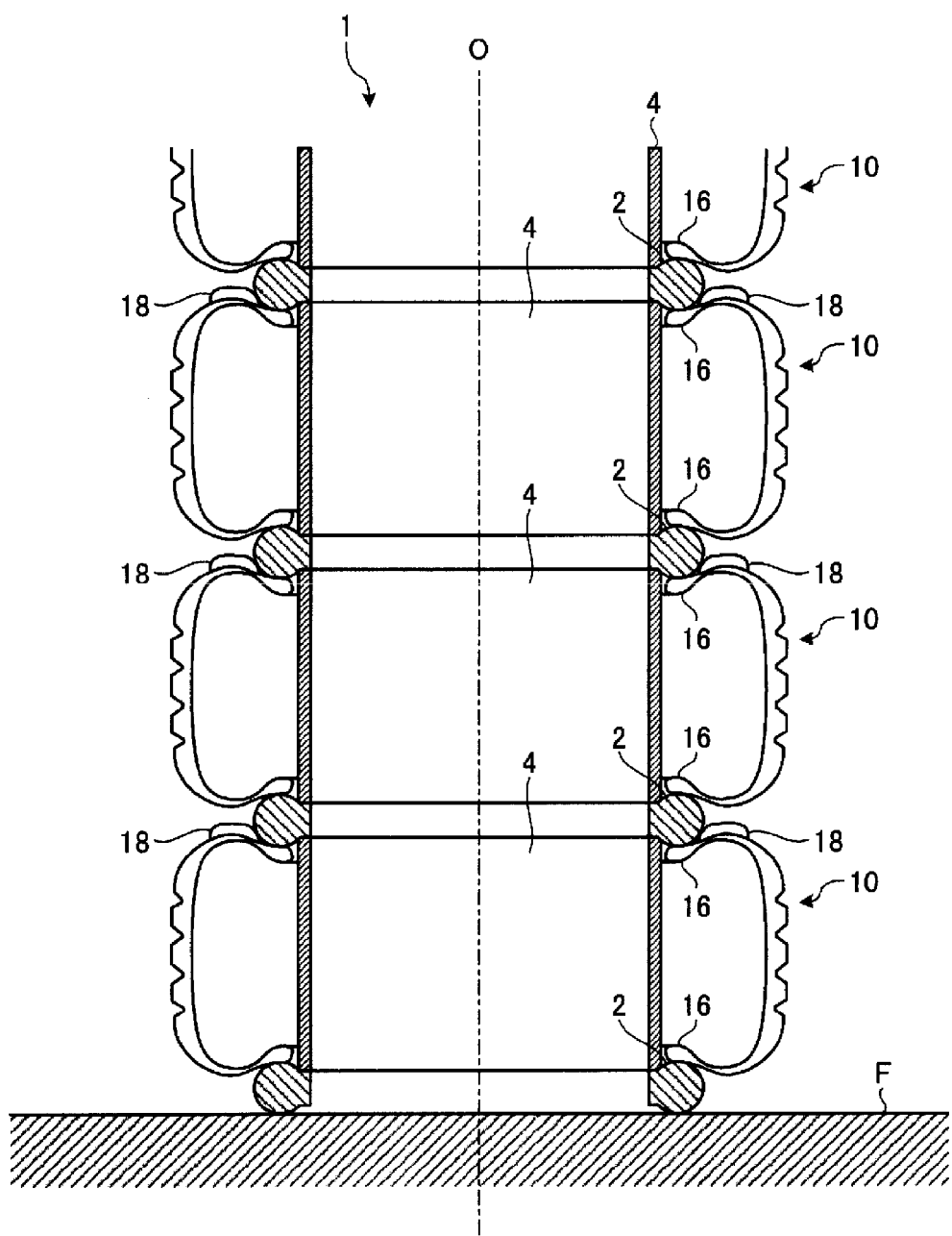
FIG. 19 is an explanatory view illustrating a modified example of the tire arrangement method illustrated in FIG. 1.
Figure 20:
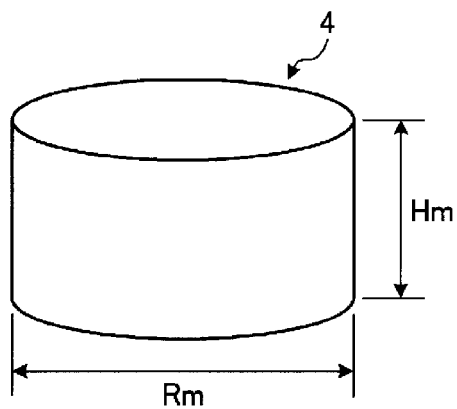
FIG. 20 is an explanatory view illustrating a modified example of the tire arrangement method illustrated in FIG. 1.
Figure 21:
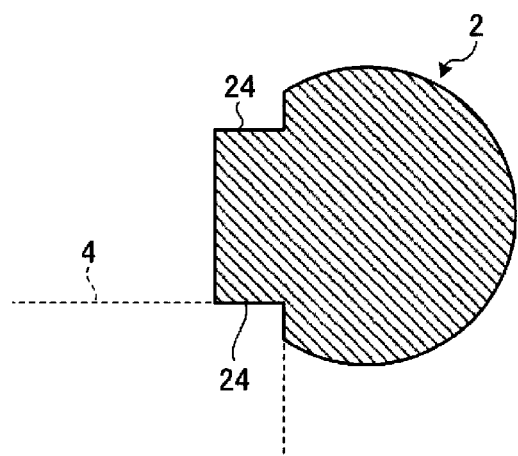
FIG. 21 is an explanatory view illustrating a modified example of the tire arrangement method illustrated in FIG. 1.
Figure 22:
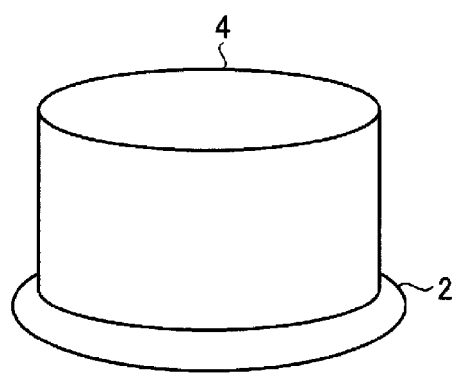
FIG. 22 is an explanatory view illustrating a modified example of the tire arrangement method illustrated in FIG. 1.

FIGS. 19 to 22 are explanatory views of a modified example of the tire arrangement method illustrated in FIG. 1. FIG. 19 illustrates the plurality of tires 10 arranged stacked on the floor F. FIG. 20 is a perspective view of an intermediate member 4 illustrated in FIG. 19. In addition, FIG. 21 is an enlarged radial direction cross-sectional view of the spacer 2 illustrated in FIG. 19. FIG. 22 is a perspective view of the assembly of the spacer 2 and the intermediate member 4.

In the configuration illustrated in FIG. 1, a plurality of spacers 2 are disposed independent of one another. In the case of the tires 10 having a low aspect ratio, due to the high rigidity of the sidewall portions 15, such a tire arrangement method can be easily achieved. However, in the case of tires provided with sidewall portions 15 with low rigidity, the bead portions 16 bend in the tire rotational axis direction, and an appropriate interval between adjacent tires 10, 10 may be unable to be ensured.

In response to this, in the configuration illustrated in FIG. 19, the tire arrangement implement 1 is provided with the intermediate member 4. The intermediate member 4 is disposed between adjacent spacers 2, 2 and maintains the interval at which the adjacent spacers 2, 2 are disposed. Accordingly, an appropriate interval between adjacent tires 10, 10 is ensured, and rubbing and deformation of the sidewall portions 15 (in particular the decorative portion 18) is reduced or prevented.

The intermediate member 4 may be of any material and shape as long as the intermediate member 4 has a rigidity appropriate to prevent large deformation or buckling. In the configuration illustrated in FIG. 19 for example, as illustrated in FIG. 20, the intermediate member 4 is constituted by a simple cylindrical member made of resin, metal, or paper.

The height Hm of the intermediate member 4 is suitably set with reference to the interval at which adjacent spacers 2, 2 are disposed disregarding any bending of the bead portion 16 when the tires are arranged. The height Hm of the intermediate member 4 depends upon the assembled configuration of the intermediate member 4 and the spacers 2, 2 but in general is approximate to the tire cross-sectional width SW when the tire is in an unloaded state.

The outer diameter Rm is smaller than the tire inner diameter and is required to be a size whereby the intermediate member 4 can be disposed between adjacent spacers 2, 2.

The intermediate member 4 and the spacer 2 have mutually connectable structures. In the configuration illustrated in FIG. 19 for example, as illustrated in FIG. 21, the spacer 2 is provided with faced portions 24, 24 on the upper and lower side in the axial direction to the inner side in the tire radial direction. In addition, these faced portions 24, 24 have an inner diameter substantially identical to the outer diameter of the intermediate member 4. The intermediate member 4 and the spacer 2 are mutually connectable via fitting and engaging the end portion of the intermediate member 4 with the faced portion 24 of the spacer 2.

In the configuration illustrated in FIG. 19, one spacer 2 is disposed between adjacent tires 10, 10; and one intermediate member 4 is inserted in the inside of the tire 10 and disposed between adjacent spacers 2, 2. In addition, a plurality of spacers 2 and intermediate members 4 are alternately arranged along the tire rotational axis O, thereby forming a columnar tire arrangement implement 1.

Specifically, as illustrated in FIG. 22, first a first spacer 2 is arranged on the floor F, and a first intermediate member 4 is arranged on the top portion of the first spacer 2. At this time, the end portion of the intermediate member 4 engages with the faced portion 24 of the spacer 2 (see FIG. 21), and the intermediate member 4 and the spacer 2 are positioned in the radial direction. Next, a first tire 10 is fitted over the intermediate member 4 and placed on the upper portion of the spacer 2. As a result, the bead portion 16 of the tire 10 and the spacer 2 engage and the tire 10 is supported by the spacer 2. Accordingly, the tire 10 is supported separated from the floor F. Next, a second spacer 2 is fitted to the upper end portion of the intermediate member 4, and a second intermediate member 4 is fitted to the upper portion of the second spacer 2. Thereafter, a second tire 10 is fitted over the second intermediate member 4 and placed on the upper portion of the second spacer 2. As a result, the bead portion 16 of the second tire 10 and the second spacer 2 engage and the tire 10 is supported by the spacer 2. Accordingly, the first tire 10 and the second tire 10 are supported separated from each other. Thereon, the spacers 2, intermediate members 4, and tires 10 are arranged stacked in order in the tire rotational axis direction. As a result, the spacers 2 and the intermediate members 4 are connected to one another and the columnar tire arrangement implement 1 is formed.

In such a configuration, the intermediate member 4 is disposed between adjacent spacers 2, 2 and maintains the interval at which the adjacent spacers 2, 2 are disposed. Accordingly, an appropriate interval between adjacent tires 10, 10, and between the tire 10 and the floor F is ensured, and rubbing and deformation of the sidewall portions 15 (in particular the decorative portion 18) is reduced or prevented. In addition, the structural strength of the tire arrangement implement 1 constituted by the spacers 2 and the intermediate members 4 is increased by the spacer 2 and the intermediate member 4 being engaged with one another (see FIG. 21). Accordingly, stacks of the tire 10 are prevented from collapsing.

Note that in the configuration described above, the spacer 2 and the intermediate member 4 are independent members and the engagement thereof forms the assembly of the spacer 2 and the intermediate member 4 (see FIG. 22).

However, the embodiment is not limited to such a configuration, and one spacer 2 and one intermediate member 4 may compose a single structure. For example, one spacer 2 and one intermediate member 4 may be integrally formed as illustrated in FIG. 22 from the start. As a result of this configuration, the structural strength of the assembly of the spacer 2 and the intermediate member 4 is increased. In addition, assembly of the spacer 2 and the intermediate member 4 is simplified.

Figure 23:
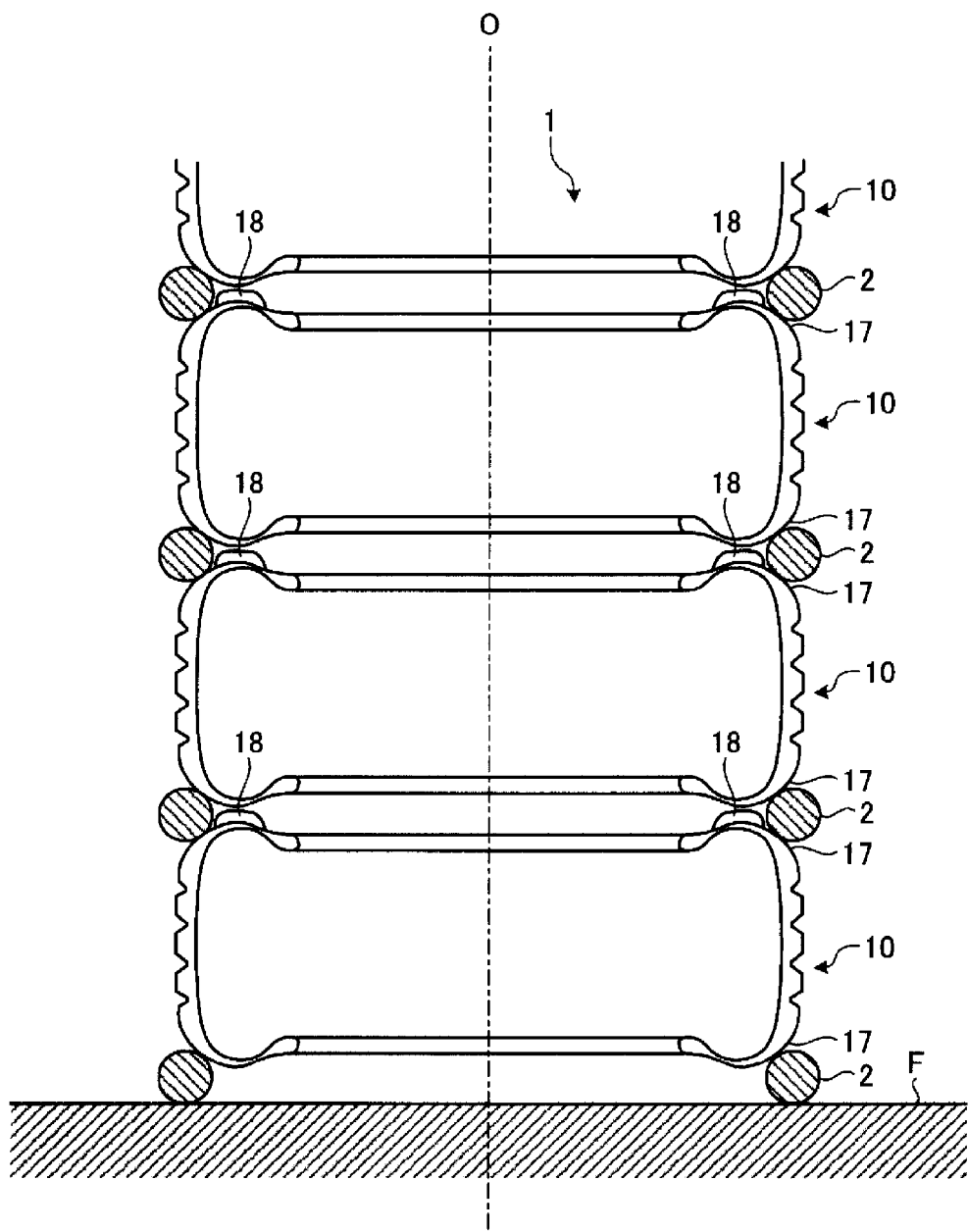
FIG. 23 is an explanatory view illustrating a modified example of the tire arrangement method illustrated in FIG. 1.
Figure 24:
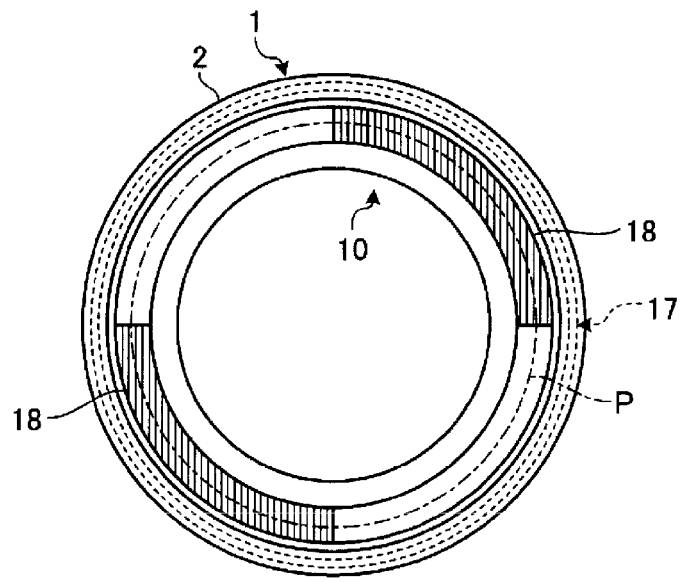
FIG. 24 is an explanatory view illustrating a modified example of the tire arrangement method illustrated in FIG. 1.

FIGS. 23 and 24 are explanatory views of a modified example of the tire arrangement method illustrated in FIG. 1. FIG. 23 is a cross-sectional view along the tire rotational axis O when a plurality of tires 10 are vertically stacked on the floor F. FIG. 24 illustrates the positional relationship between the tire 10 illustrated in FIG. 23 and the tire arrangement implement 1 in the tire radial direction. In these drawings, components that are the same as components illustrated in FIG. 1 are given the same reference numerals, and explanations thereof are omitted.

In the configuration illustrated in FIGS. 1 and 2, the spacer 2 is disposed to the inner side of the tire maximum width position P in the tire radial direction and supports the tire 10 by engagement with the bead portion 16 of tire 10.

Conversely, in the configuration illustrated in FIGS. 23 and 24, the spacer 2 is disposed to the outer side of the tire maximum width position P in the radial direction and supports the tire 10 by engagement with the shoulder portion 17 of the tire 10. Specifically, the inner diameter $R_i$ of the spacer 2 (see FIG. 4) and the tire diameter $R1$ at the tire maximum width position P (see FIG. 3) have the relationship $R1 < R_i$. In addition, the relationship between the inner diameter $R_i$ of the spacer 2 and the tire outer diameter $R5$ (see FIG. 3) is suitably set in the range of $R_i < R5$ such that the spacer 2 can engage with the shoulder portion 17. Such a configuration can also ensure an appropriate interval between adjacent tires 10, 10 and between the tire 10 and the floor F.

The outer diameter $R4$ of the decorative portion 18 is measured with reference to the point furthest to the outer side of the region where the decorative portion 18 is disposed in the tire radial direction (see FIG. 3).

The tire outer diameter $R5$ is measured by measuring the outer diameter of an individual tire in an unloaded state along the tire equatorial plane CL.

In the configuration illustrated in FIG. 23 for example, the inner diameter $R_i$ of the spacer 2 (see FIG. 4), the outer diameter $R4$ of the decorative portion 18, and the tire outer diameter $R5$ (see FIG. 3) have the relationship such that $R4 < R_i < R5$. In addition, the outer diameter $R_o$ of the spacer 2 (see FIG. 4) is slightly larger than the tire outer diameter $R5$. The cross-sectional height H of the spacer 2 (see FIG. 5) is set to an appropriate height whereby adjacent tires 10, 10 can be separated.

The plurality of tires 10 are arranged stacked in a row on the floor F with the tire rotational axes O thereof vertically facing. One spacer 2 is arranged between adjacent tires 10, 10 and between the tire 10 and the floor F. In addition, the plurality of tires 10 and spacers 2 are alternately arranged.

Specifically, a first spacer 2 is initially disposed on the floor F. Thereafter, a first tire 10 is placed on the upper portion of the first spacer 2 with the axes thereof aligned. As a result, the shoulder portion 17 of the tire 10 and the spacer 2 engage and the tire 10 is supported by the spacer 2. Accordingly, the tire 10 is supported separated from the floor F. Next, a second spacer 2 is arranged on the upper portion of the first tire 10 with the axes thereof aligned (see FIG. 24). Thereafter, a second tire 10 is placed on the upper portion of the second spacer 2. As a result, the shoulder portion 17 of the second tire 10 and the second spacer 2 engage and the tire 10 is supported by the spacer 2. Accordingly, the first tire 10 and the second tire 10 are supported separated from each other. Thereafter, the plurality of spacers 2 and tires 10 are alternately arranged stacked in a row in the tire rotational axis direction. Accordingly, the plurality of tires 10 are arranged with the decorative portion 18 located on the sidewall portion 15 not in contact with the adjacent tire 10 or the floor F.

Figure 25:
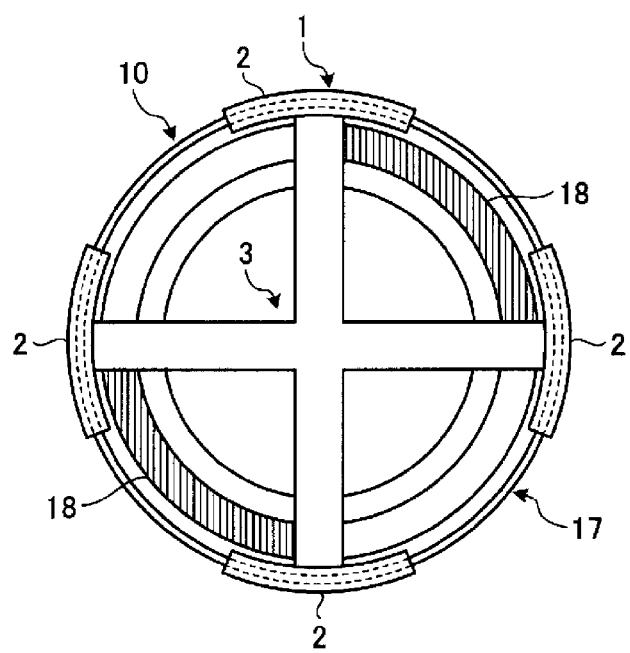
FIG. 25 is an explanatory view illustrating a modified example of the tire arrangement method illustrated in FIG. 1.
Figure 26:
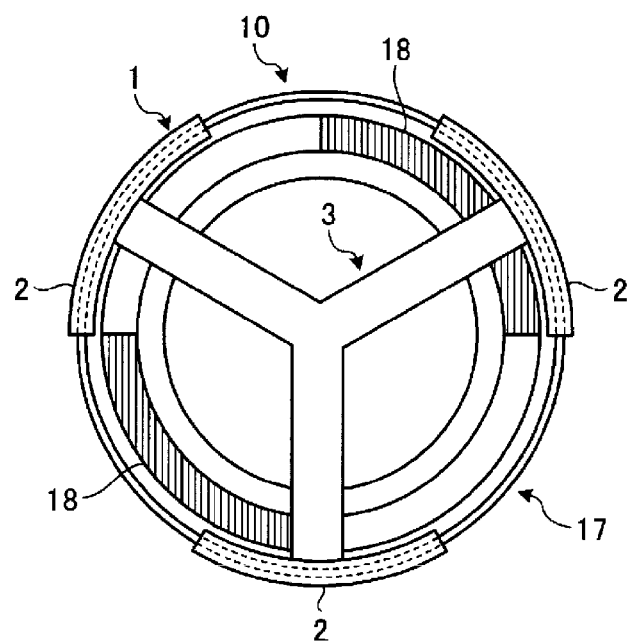
FIG. 26 is an explanatory view illustrating a modified example of the tire arrangement method illustrated in FIG. 1.
Figure 27:
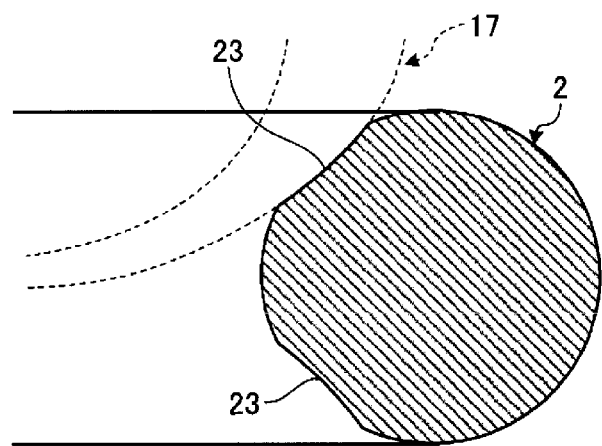
FIG. 27 is an explanatory view illustrating a modified example of the tire arrangement method illustrated in FIG. 1.

FIGS. 25 to 27 are explanatory views of modified examples of the tire arrangement method illustrated in FIG. 1. FIGS. 25 and 26 illustrate the positional relationship between the tire 10 and the tire arrangement implement 1 in the tire radial direction. FIG. 27 illustrates a radial direction cross-sectional view of the spacer 2.

In the configuration illustrated in FIG. 23, as illustrated in FIG. 24, the spacer 2 has the annular structure illustrated in FIGS. 4 and 5 and is arranged individually with the tire 10. In such a configuration, when the tires are arranged, the spacer 2 is arranged in a manner in which the spacer 2 and the decorative portion 18 of the tire 10 do not intersect with each other. Such a configuration is preferable from the perspective of reducing or preventing rubbing and deformation of the decorative portion 18 due to contact between the spacer 2 and the decorative portion 18.

However, the embodiment is not limited to such a configuration, and the spacer 2 may have the configuration illustrated in FIGS. 6 to 9. In such a case, as illustrated in FIGS. 25 and 26, the spacer 2 and the decorative portion 18 of the tire 10 may intersect when viewed in plane. However, an appropriate interval between the spacer 2 and the decorative portion 18 is preferably ensured by ensuring an appropriate cross-sectional height H of the spacer 2 (see FIG. 5).

In the configuration illustrated in FIG. 23, as illustrated in FIG. 27, the spacer 2 is preferably provided with the recessed portion 23 that mates with the circumferential surface of the tire 10. In such a configuration, the spacer 2 stably engages with the tire 10 via the mating of the recessed portion 23 of the spacer 2 and the circumferential surface of the tire 10 when the tires are arranged. Accordingly, relative change in position between the spacer 2 and the tire 10 is reduced or prevented.

For example, in the configuration illustrated in FIG. 27, the spacer 2 has a circular cross section including the arcuate recessed portion 23. In addition, the recessed portion 23 is disposed at a position and has a size that enables mating with the region of the shoulder portion 17 of the tire 10 that does not come into contact with the ground. Specifically, the spacer 2 is provided with a pair of recessed portions 23, 23 at positions on the upper and lower side in the axial direction to the outer side in the radial direction of the spacer 2. In addition, the spacer 2 has a uniform cross section in the circumferential direction. As a result, the recessed portions 23, 23 are formed along the entire circumference of the spacer 2. The recessed portion 23 has a curvature substantially identical with that of the profile of the shoulder portion 17 when viewed in cross section along the tire meridian direction.

In such a configuration, the recessed portion 23 of the spacer 2 and the bead heel of the bead portion 16 fit snugly and are stably engaged with each other when tires 10 are stacked as illustrated in FIGS. 1 and 2. Accordingly, relative change in position between the spacer 2 and the tire 10 is effectively reduced or prevented and stacks of the tires 10 are prevented from collapsing.

Figure 28:
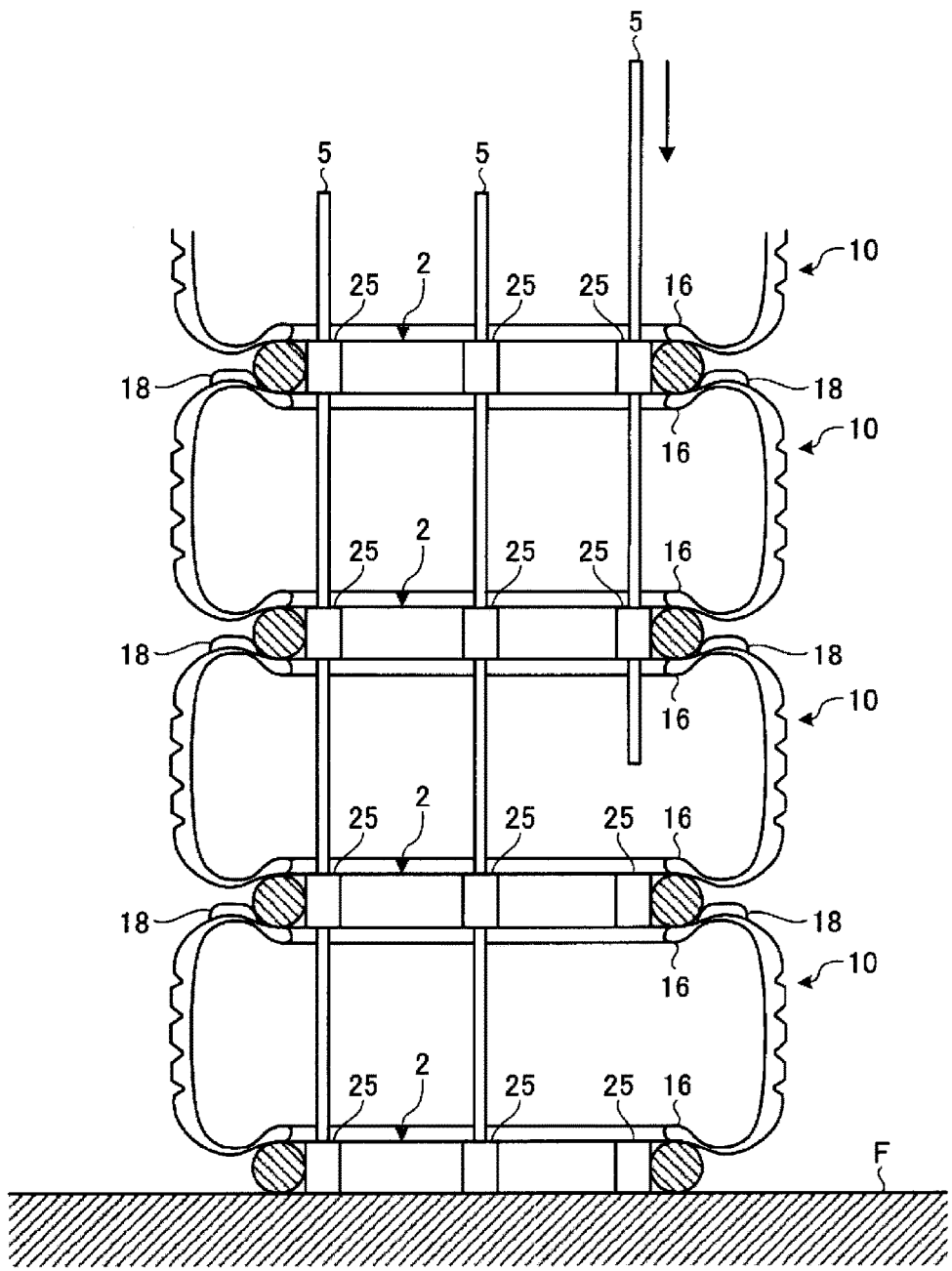
FIG. 28 is an explanatory view illustrating a modified example of the tire arrangement method illustrated in FIG. 1.
Figure 29:
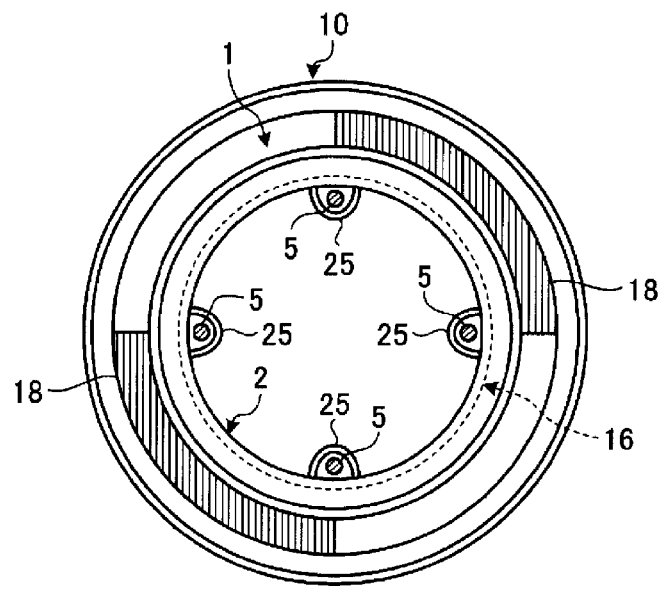
FIG. 29 is an explanatory view illustrating a modified example of the tire arrangement method illustrated in FIG. 1.

FIGS. 28 and 29 are explanatory views of a modified example of the tire arrangement method illustrated in FIG. 1. FIG. 28 is a cross-sectional view along the tire rotational axis O when a plurality of tires 10 are vertically stacked on the floor F. FIG. 29 illustrates the positional relationship between the tire 10 illustrated in FIG. 28 and the tire arrangement implement 1 in the tire radial direction. In these drawings, components that are the same as components illustrated in FIG. 1 are given the same reference numerals, and explanations thereof are omitted.

In the configuration illustrated in FIG. 1, a plurality of spacers 2 are disposed independent of one another. In the case of tires 10 having a large tire size for example, even when the plurality of tires 10 are arranged stacked in the vertical direction, the stacks do not collapse easily. However, in the case of tires 10 having a small tire size, such stacks of tires 10 become unstable and may collapse.

In response to this, in the configuration illustrated in FIGS. 28 and 29, the tire arrangement implement 1 is provided with supporting columns 5 that support the plurality of spacers 2. Accordingly, stacks of the tire 10 are prevented from collapsing.

The supporting columns 5 are constituted by a columnar member and restrict relative displacement of adjacent spacers 2. The shape, material, size, and the like of the supporting columns 5 are not particularly limited. However, the supporting columns 5 are preferably light weight, have appropriate rigidity, and can be easily handled when the tires are arranged.

In the configuration illustrated in FIGS. 28 and 29 for example, the supporting columns 5 are made of metal and are constituted by a long rod-like member with a small diameter and a circular cross section. Four supporting columns 5 are used. In addition, the spacer 2 is provided with four holding portions 25 for holding the supporting columns 5. The holding portions 25 are, for example, short cylindrical pipe members that have their longitudinal direction aligned with the axial direction of the spacer 2 and are either installed or integrally formed in the inner circumferential surface of the spacer 2.

The plurality of tires 10 are arranged stacked in a row on the floor F with the tire rotational axes O thereof vertically facing. One spacer 2 is arranged between adjacent tires 10, 10 and between the tire 10 and the floor F. In addition, the plurality of tires 10 and spacers 2 are alternately arranged. A total of four supporting columns 5 pass through the holding portions 25 of the spacers 2 and support the spacers 2. Accordingly, the supporting columns 5 restrict the relative displacement of adjacent spacers 2 in the radial direction.

FIGS. 30 to 33 are explanatory views of modified examples of the tire arrangement method illustrated in FIG. 28. FIGS. 30 to 33 illustrate the positional relationship between the tire 10 and the tire arrangement implement 1 in the tire radial direction.

In the configuration illustrated in FIGS. 28 and 29, the spacer 2 has an annular structure and engages with the bead portion 16 of the tire 10 to support the tire 10. The holding portions 25 for holding the supporting columns 5 are arranged on the inner circumferential surface of the spacer 2.

Figure 30:
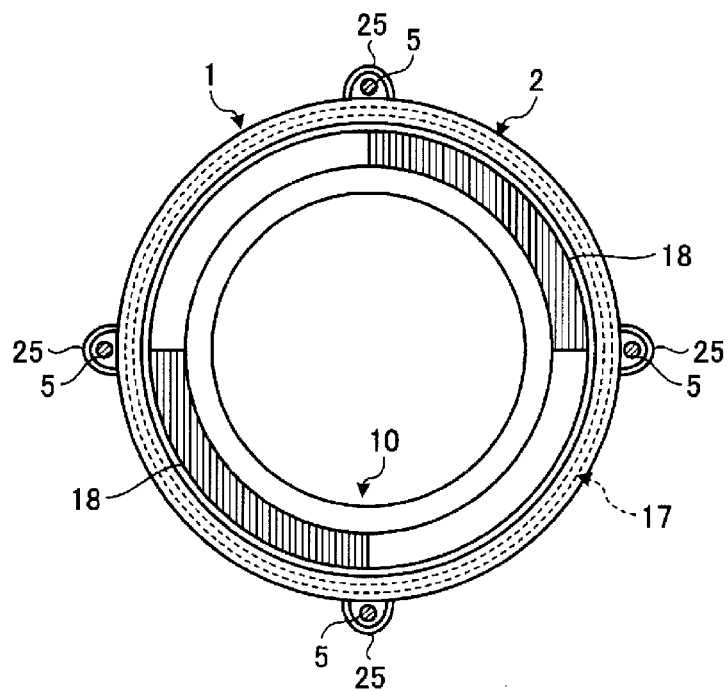
FIG. 30 is an explanatory view illustrating a modified example of the tire arrangement method illustrated in FIG. 28.

However, the embodiment is not limited to such a configuration, and as illustrated in FIG. 30, the spacer 2 may have an annular structure and engage with the shoulder portion 17 of the tire 10 to support the tire 10. In such a case, the holding portions 25 for holding the supporting columns 5 are arranged on the outer circumferential surface of the spacer 2.

Figure 31:
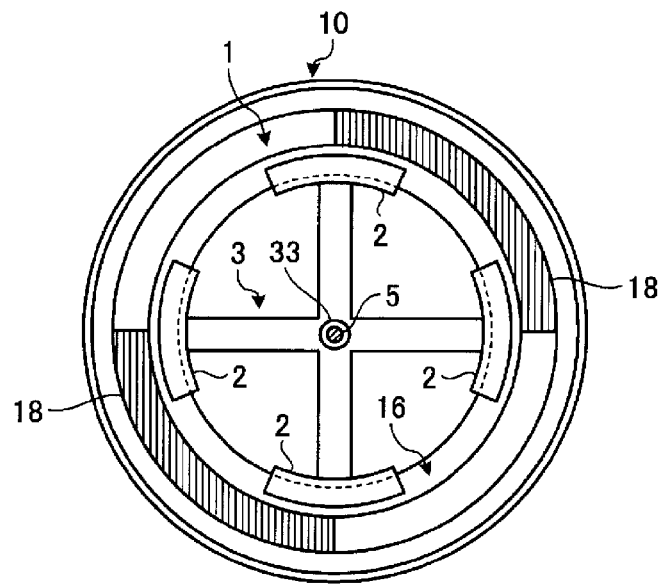
FIG. 31 is an explanatory view illustrating a modified example of the tire arrangement method illustrated in FIG. 28.
Figure 32:
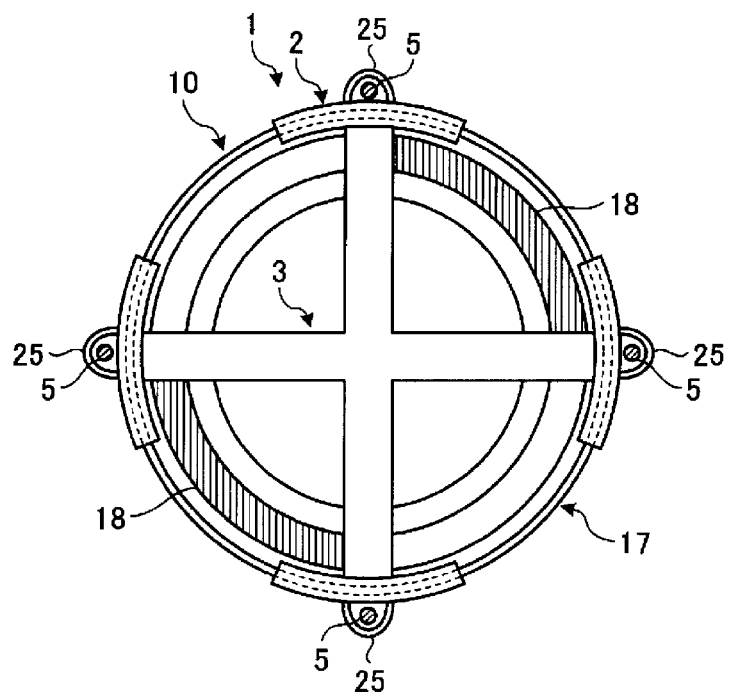
FIG. 32 is an explanatory view illustrating a modified example of the tire arrangement method illustrated in FIG. 28.
Figure 33:
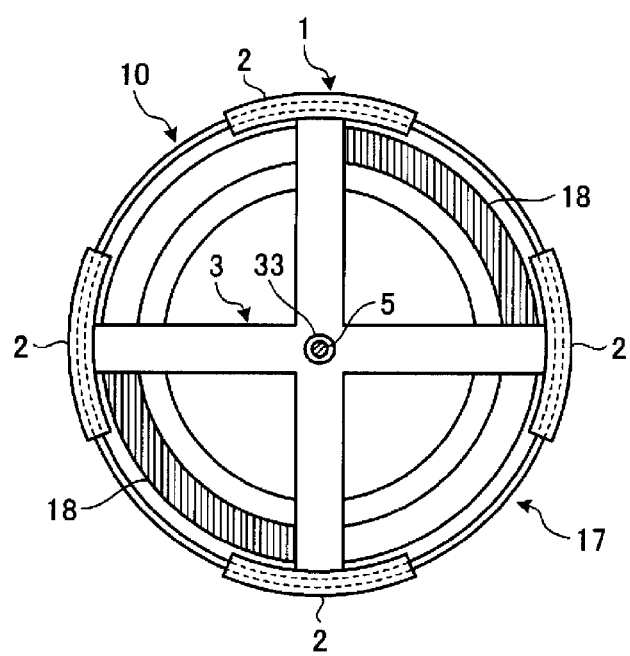
FIG. 33 is an explanatory view illustrating a modified example of the tire arrangement method illustrated in FIG. 28.

As illustrated in FIGS. 31 to 33, the tire arrangement implement 1 may be provided with the plurality of spacers 2 arranged at predetermined intervals in an annular manner, and the arm 3 for supporting the spacers 2. In such configurations, as illustrated in FIG. 31, the plurality of spacers 2 may engage with the bead portion 16 of the tire 10 to support the tire 10, or alternatively as illustrated in FIGS. 32 and 33, may engage with the shoulder portion 17 of the tire 10 to support the tire 10. In these cases, as illustrated in FIG. 32, the holding portions 25 for holding the supporting columns 5 may be arranged on the outer circumferential surface of the spacer 2, or alternatively as illustrated in FIGS. 31 and 33, the arm 3 may be provided with a holding portion 33 for holding the supporting column 5. For example, in the configurations illustrated in FIGS. 31 and 33, the supporting column 5 is passed through and supported by the holding portion 33, which is a hole disposed in the center of the arm 3 passing through the arm 3 in the axial direction.

Figure 34:
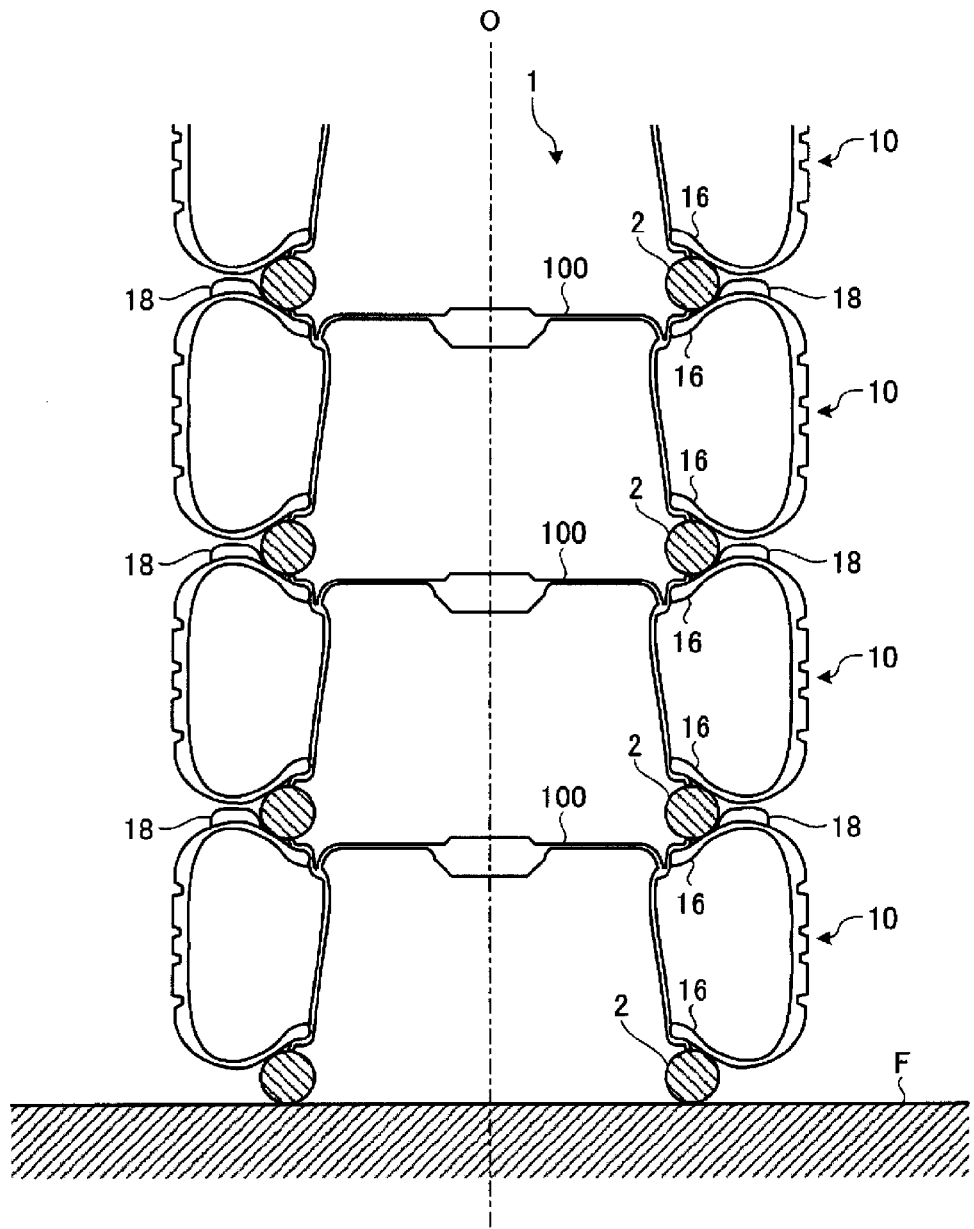
FIG. 34 is an explanatory view illustrating a modified example of the tire arrangement method illustrated in FIG. 1.
Figure 35:
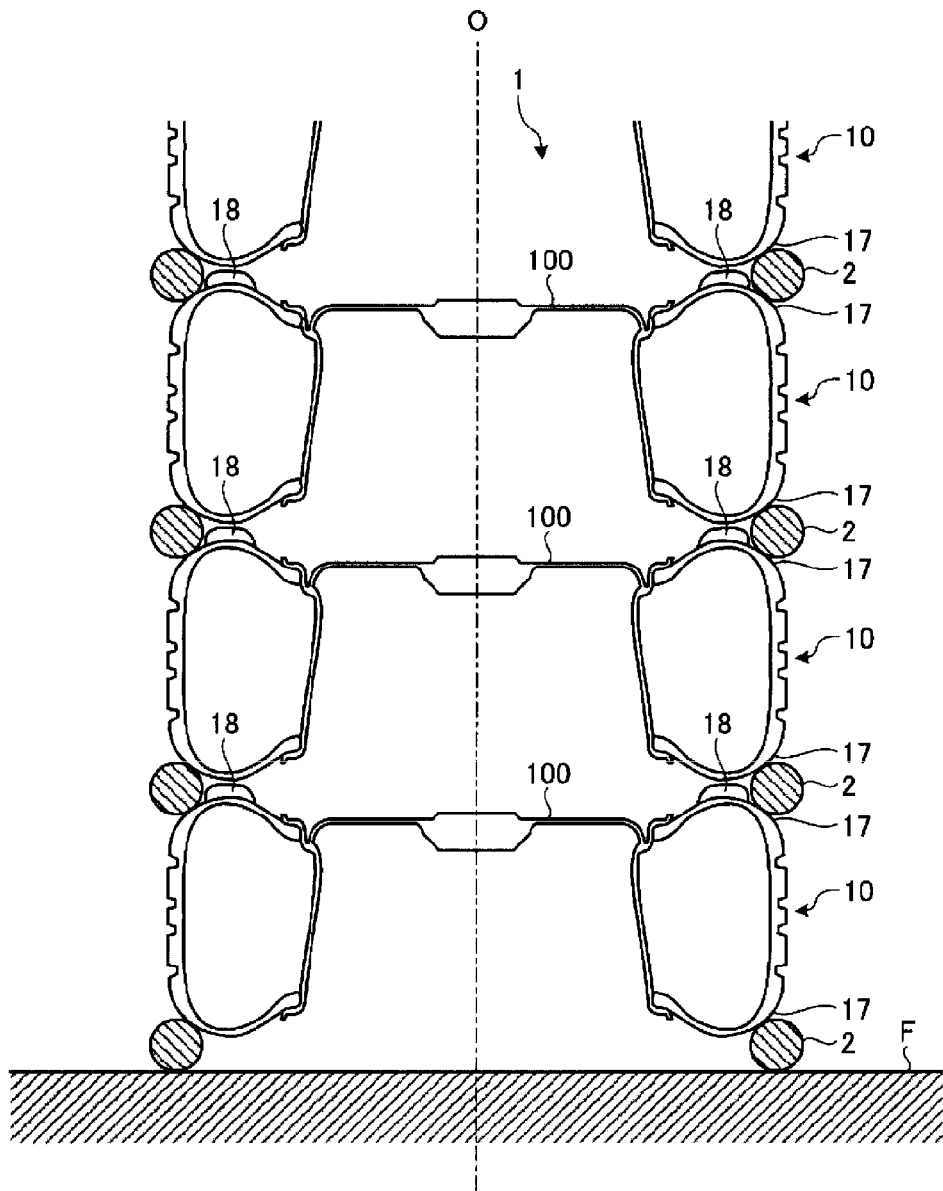
FIG. 35 is an explanatory view illustrating a modified example of the tire arrangement method illustrated in FIG. 1.

FIGS. 34 and 35 are explanatory views of modified examples of the tire arrangement method illustrated in FIG. 1. FIGS. 34 and 35 are cross-sectional views along the tire rotational axis O when a plurality of tire-wheel assemblies 10, 100 are vertically stacked on the floor F.

In the configuration illustrated in FIG. 1, a plurality of individual tires 10 are arranged. Therefore, the spacer 2 is employed as an interposing member and disposed between adjacent individual tires 10, 10.

However the embodiment is not limited to such a configuration, and as illustrated in FIGS. 34 and 35, in the configuration in which a plurality of tire-wheel assemblies 10, 100 are arranged in a row in the tire rotational axis direction, the spacer 2 may be disposed between adjacent tire-wheel assemblies or between a tire-wheel assembly and a peripherally located member. In such a case, in a similar manner to that illustrated in FIG. 1, the spacer 2 is employed as an interposing member that separates the decorative portion 18 of the tire 10 from other tire-wheel assemblies or peripherally located members and is arranged not in contact with the decorative portion 18 of the tire 10. Accordingly, rubbing and deformation of the decorative portion 18 of the tire 10 can be reduced or prevented.

As described above, in the configuration illustrated in FIG. 1, only the spacer 2 with a small diameter is used and disposed between the bead portions 16, 16 of adjacent tires 10, 10. In contrast, in the configuration illustrated in FIG. 23, only the spacer 2 with a large diameter is used and disposed between the shoulder portions 17, 17 of adjacent tires 10, 10. In these configurations, only one of the types of spacers 2, small diameter spacers 2 or large diameter spacers 2, can be used, which is preferable.

However, the embodiment is not limited to such configurations, and small diameter spacers 2 (FIG. 1) and large diameter spacers 2 (FIG. 23) may be used together (not illustrated). Similarly, various types of spacers 2 may be used together, such as the annular spacer 2 illustrated in FIG. 4, and the spacer 2 provided with the arm 3 illustrated in FIGS. 6 and 8.

Effect

As described above, the tire arrangement implement 1 is employed to arrange a plurality of tires 10, each provided with the decorative portion 18 located on the sidewall portion 15, in a row in the tire rotational axis direction (see FIGS. 1, 2, 23, and 24). The tire arrangement implement 1 is provided with the spacer 2. The spacer 2 is disposed between adjacent tires 10, 10 or between the tire 10 and the peripherally located member (in FIGS. 1 and 23, floor F) not in contact with the decorative portion 18, and separates the decorative portion 18 of one tire 10 from another tire 10 or the peripherally located member.

In such a configuration, the spacer 2 separates the decorative portion 18 of one tire 10 from another tire 10 or the peripherally located member when the plurality of tires 10 are arranged in a row. Accordingly, rubbing and deformation of the decorative portion 18 is reduced or prevented, and blemishes that detract from the appearance of the tire 10 are prevented, which is advantageous.

In addition, the tire arrangement implement 1 is provided with the intermediate member 4. The intermediate member 4 is disposed between adjacent spacers 2, 2 and maintains the interval at which the adjacent spacers 2, 2 are disposed (see FIGS. 19 to 21). In such a configuration, the intermediate member 4 maintains the interval at which adjacent spacers 2, 2 are disposed. Accordingly, the intermediate member 4 prevents contact between the decorative portions 18 of tires 10 and other tires 10 when the tires 10 bend and deform for example, which is advantageous.

In the tire arrangement implement 1, one spacer 2 and one intermediate member 4 compose a single structure (see FIG. 22). Accordingly, assembly of the spacer 2 and the intermediate member 4 is simplified, which is advantageous.

In addition, the tire arrangement implement 1 has a structure which is detachable from the tire 10 (not illustrated). In such a configuration, the arranged tires 10 can be maintained in a stable manner by attaching the tire arrangement implement 1 to the tire 10. Accordingly, stacks of the tire 10 can be prevented from collapsing, which is advantageous. In particular, the spacer 2 can be prevented from falling out when the tires 10 are arranged in a row horizontally, which is preferable.

In the tire arrangement implement 1, the outer diameter Ro of the spacer 2 (see FIG. 4) and the tire diameter R1 at the tire maximum width position P (see FIG. 3) have the relationship Ro<R1. Accordingly, the spacer 2 can be disposed to the inner side of the tire maximum width position P in the tire radial direction, which is advantageous (see FIGS. 1 and 2).

In the tire arrangement implement 1, the outer diameter Ro of the spacer (see FIG. 4) and the inner diameter R2 of the decorative portion 18 (see FIG. 3) have the relationship Ro<R2. Accordingly, the spacer 2 can be disposed to the inner side of the tire maximum width position P in the tire radial direction while reducing or preventing interference between the spacer 2 and the decorative portion 18, which is advantageous (see FIGS. 1 and 2).

In the tire arrangement implement 1, the outer diameter Ro of the spacer 2 (see FIG. 4) and the diameter R3 of the bead cores 11 of the tire 10 (see FIG. 3) have the relationship R3<Ro. Accordingly, the spacer 2 can be prevented from falling out from the inside of the tire, which is advantageous.

In the tire arrangement implement 1, the inner diameter Ri of the spacer 2 (see FIG. 4) and the tire diameter R1 at the tire maximum width position P (see FIG. 3) have the relationship R1<Ri. Accordingly, the spacer 2 can be disposed to the outer side of the tire maximum width position P in the tire radial direction, which is advantageous (see FIGS. 23 and 24).

In the tire arrangement implement 1, the inner diameter Ri of the spacer 2 (see FIG. 4) and the outer diameter R4 of the decorative portion 18 (see FIG. 3) have the relationship R4<Ri. Accordingly, the spacer 2 can be disposed to the outer side of the tire maximum width position P in the tire radial direction while reducing or preventing interference between the spacer 2 and the decorative portion 18, which is advantageous (see FIGS. 23 and 24).

In addition, in the tire arrangement implement 1, the spacer 2 has an annular structure (see FIGS. 4 and 5). Accordingly, the area of the spacer 2 and the tire 10 in contact with each other is increased allowing the spacer 2 to stably support the tire 10, which is advantageous. An annular structure is also advantageous compared to a circular plate shaped spacer (not illustrated) because weight of the spacer 2 can be reduced.

The tire arrangement implement 1 is provided with the plurality of spacers 2 arranged at predetermined intervals in an annular manner, and the arm 3 for supporting the spacers 2 (see FIGS. 6 and 7). This has the advantage of making the spacer 2 more lightweight.

In addition, in the tire arrangement implement 1, the spacer 2 has a structure in which the outer diameter Ro and the inner diameter Ri are expandable and reducible (see FIGS. 10 and 11). Accordingly, the spacer 2 can be used to arrange various tires 10 having different tire sizes, which is advantageous.

In addition, in the tire arrangement implement 1, the spacer 2 is provided with the recessed portion 23 that mates with the circumferential surface of the tire 10 (see FIGS. 15 to 17 and 27). In such a configuration, the spacer 2 and the tire 10 are precisely positioned via the mating of the recessed portion 23 of the spacer 2 and the circumferential surface of the tire 10 when the tires are arranged, which is advantageous. In the configuration in which tires 10 are stacked (see FIGS. 1 and 23), the spacer 2 stably supports the tires 10, effectively preventing the stack of tires 10 from collapsing, which is advantageous.

The tire arrangement implement 1 is provided with the supporting column 5 that supports the plurality of spacers 2 (see FIGS. 28 and 29). Accordingly, relative change in position between the spacers 2 is reduced or prevented, effectively preventing the stack of tires 10 from collapsing, which is advantageous. Such a configuration is particularly advantageous when stacking the tires 10.

In the tire arrangement implement 1, the spacer 2 is made from metal or resin. This has the advantage of reducing or preventing deformation of the spacer 2.

The tire arrangement implement 1 is employed to arrange in a row in the tire rotational axis direction a plurality of tire-wheel assemblies constituted by tires 10, each provided with the decorative portion 18 located on the sidewall portion 15, and wheels 100 (not illustrated). The tire arrangement implement 1 is provided with the spacer 2. The spacer 2 is disposed between adjacent tire-wheel assemblies or a tire-wheel assembly and the peripherally located member not in contact with the decorative portion 18, and separates the decorative portion 18 of one tire-wheel assembly from another tire-wheel assembly or the peripherally located member.

In such a configuration, the spacer 2 separates the decorative portion 18 of one tire-wheel assembly from another tire-wheel assembly or the peripherally located member when the plurality of tire-wheel assemblies are arranged in a row. Accordingly, rubbing and deformation of the decorative portion 18 is reduced or prevented, and blemishes that detract from the appearance of the tire 10 are prevented when tires are arranged, which is advantageous.

In the tire arrangement method, the tire arrangement implement 1 described above is employed (see FIGS. 1, 2, 23, and 24). Accordingly, rubbing and deformation of the decorative portion 18 of the tire 10 is reduced or prevented, and blemishes that detract from the appearance of the tire 10 are prevented when tires are arranged, which is advantageous.

In the tire arrangement method, the tires and the spacers are alternately arranged in the tire rotational axis direction (see FIGS. 1, 2, 23, and 24). Accordingly, the tires 10 are arranged separated from one another, which is advantageous.

Examples

Figure 37:
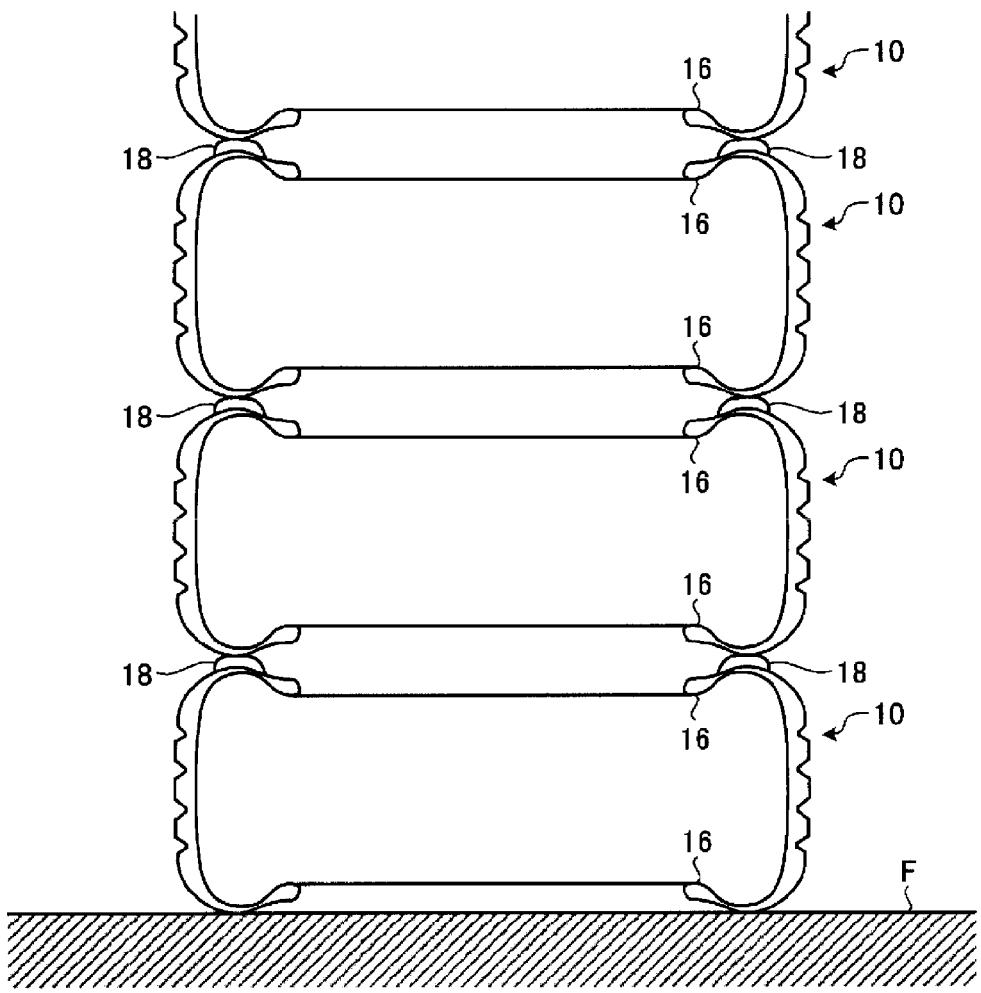
FIG. 37 is an explanatory view illustrating a tire arrangement method of a conventional example.

FIG. 36 is a table showing results of performance testing of pneumatic tires according to the embodiment of the present technology. FIG. 37 is an explanatory view illustrating a tire arrangement method of a conventional example.

In the performance testing, various tires provided with a decorative portion (colored portion or fin) located in a prescribed region on the sidewall portion were observed for blemishes that detract from the appearance of the decorative portion when four individual tires were arranged stacked with the tire rotational axes thereof aligned. Then, the number of locations where blemishes formed on the four tires was totaled and evaluated. In this evaluation, a smaller value is preferable. Note that the tire size of each tire was 195/65R15 91H.

(1) The performance testing of tires with a colored portion as the decorative portion was carried out as follows. First, four individual tires were arranged stacked vertically on a tire cart with the tire rotational axes thereof aligned. Then, the tire cart was made to do ten laps of a 100 m predetermined course. Thereafter, the tires were observed for blemishes that detract from the appearance of the decorative portions (in particular, rubbing of the colored portion).

(2) The performance testing of tires with a fin as the decorative portion was carried out as follows. First, four individual tires were arranged stacked vertically on a flat floor with the tire rotational axes thereof aligned. Then, the tires were left in storage for seven days. After the seven days, the tires were observed for blemishes that detract from the appearance of the decorative portions (in particular, deformation of the fin).

The tires of Working Examples 1 and 2 were provided with a colored portion located on the sidewall portion. The tires of Working Examples 3 and 4 were provided with a fin located on the sidewall portion. In Working Examples 1 and 3, the four individual tires were arranged stacked on the floor F of a tire cart in the manner illustrated in FIGS. 1 and 2. In Working Examples 2 and 4, the four individual tires were arranged stacked on the floor F of a storehouse in the manner illustrated in FIGS. 23 and 24. In addition, the tire arrangement implement 1 was constituted by spacers 2 only with an annular structure as illustrated in FIGS. 4 and 5.

The tires of Conventional Example 1 were provided with a colored portion located on the sidewall portion. The tires of Conventional Example 2 were provided with a fin located on the sidewall portion. The four individual tires of Conventional Examples 1 and 2 were arranged stacked directly on the floor without employing the tire arrangement implement 1. Accordingly, as illustrated in FIG. 37, the tires are arranged with the sidewall portions of adjacent tires in contact with one another.

As shown by the test results, with the tire arrangement methods of Working Examples 1 to 4, blemishes were not observed on the decorative portions.

The invention claimed is:

1. A tire arrangement system comprising tires and a tire arrangement implement for arranging the tires, the tires having a decorative portion in a row in a tire rotational axis direction, and the tire arrangement implement comprising:
   a spacer configured to be disposed between bead portions of adjacent tires or between a bead portion of one of the tires and a peripherally located member, not in contact with the decorative portion, the spacer separating the decorative portion of the adjacent tires or of the one of the tires from the peripherally located member; wherein
   an outer diameter Ro of the spacer, an inner diameter Ri of the spacer and a diameter R3 of a bead core of the tire have a relationship Ri<R3<Ro; and
   the outer diameter Ro, a tire diameter R1 at a tire maximum width position and an inner diameter R2 of the decorative portion have relationships Ro<R1 and Ro<R2.

2. The tire arrangement implement according to claim 1 wherein the tire arrangement implement has a structure which is detachable from the tire.

3. The tire arrangement implement according to claim 1, wherein the spacer has an annular structure.

4. The tire arrangement implement according to claim 1, further comprising:
   a plurality of the spacers arranged at predetermined intervals in an annular manner; and
   an arm configured to support the spacers.

5. The tire arrangement implement according to claim 1, wherein the spacer includes a structure in which the outer diameter Ro and the inner diameter Ri are expandable and reducible.

6. The tire arrangement implement according to claim 1, wherein the spacer is provided with a recessed portion configured to mate with a circumferential surface of the tire.

7. The tire arrangement implement according to claim 1, further comprising a supporting column configured to support a plurality of the spacers.

8. The tire arrangement implement according to claim 1, wherein the spacer is made of metal or resin.

9. The tire arrangement implement according to claim 1, further comprising an intermediate member disposed between adjacent spacers of the spacers and configured to maintain an interval at which the adjacent spacers are disposed.

10. The tire arrangement implement according to claim 9, wherein one of the spacers and one of the intermediate members form an integral structure.

11. A tire arrangement method comprising the step of:
    using the tire arrangement implement described in claim 1.

12. The tire arrangement method according to claim 11, wherein the tires and the spacers are alternately arranged in the tire rotational axis direction.

13. A tire arrangement system comprising tires and a tire arrangement implement for arranging the tires, the tires having a decorative portion in a row in a tire rotational axis direction, and the tire arrangement implement comprising:

a spacer configured to be disposed between shoulder portions of adjacent tires or between the shoulder portion of one of the tires and a peripherally located member, not in contact with the decorative portion and not in contact with a ground, the spacer separating the decorative portion of the adjacent tires or of the one of the tires from the peripherally located member; wherein an outer diameter Ro of the spacer is larger than an tire outer diameter R5;

an inner diameter Ri of the spacer, a tire diameter R1 at a tire maximum width position and an outer diameter R4 of the decorative portion have a relationships R1<Ri and R4<Ri; and the spacer is made of metal or resin.

14. A tire arrangement system comprising tires and a tire arrangement implement for arranging the tires in a row in a tire rotational axis direction, the tire arrangement implement comprising:

a spacer configured to be disposed between bead portions of adjacent tires of the tires to be arranged or between a bead portion of one of the tires to be arranged and a peripherally located member, the spacer being configured to separate a decorative portion of the adjacent tires or of the one of the tires from the peripherally located member;

wherein an outer diameter Ro of the spacer and an inner diameter Ri of the spacer are configured relative to a diameter R3 of a bead core of the tires to be arranged to have a relationship Ri<R3<Ro;

the outer diameter Ro of the spacer is configured relative to a tire diameter R1 at a tire maximum width position of the tires to be arranged to have a relationship Ro<R1; and the outer diameter Ro of the spacer is configured relative to an inner diameter R2 of the decorative portion of the tires to be arranged to have a relationship Ro<R2.

* * * * *